(12) United States Patent
Herbach et al.

(10) Patent No.: US 8,424,102 B1
(45) Date of Patent: Apr. 16, 2013

(54) DOCUMENT ACCESS AUDITING

(75) Inventors: Jonathan D. Herbach, Mountain View, CA (US); James Donahue, Sunnyvale, CA (US); William M. Shapiro, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 435 days.

(21) Appl. No.: 12/698,972

(22) Filed: Feb. 2, 2010

Related U.S. Application Data

(62) Division of application No. 10/931,323, filed on Aug. 31, 2004, now Pat. No. 7,707,642.

(51) Int. Cl.
*H04L 29/06* (2006.01)

(52) U.S. Cl.
USPC .......................................................... 726/27

(58) Field of Classification Search ............... 726/27
See application file for complete search history.

(56) References Cited

U.S. PATENT DOCUMENTS

| | | | |
|---|---|---|---|
| 5,119,493 A * | 6/1992 | Janis et al. ................... 718/101 |
| 5,767,847 A * | 6/1998 | Mori et al. ................... 715/733 |
| 5,862,346 A | 1/1999 | Kley et al. |
| 6,021,202 A * | 2/2000 | Anderson et al. ............. 705/54 |
| 6,061,697 A * | 5/2000 | Nakao .......................... 715/229 |
| 6,161,146 A | 12/2000 | Kley et al. |
| 6,209,095 B1 * | 3/2001 | Anderson et al. ............ 713/176 |
| 6,212,512 B1 * | 4/2001 | Barney et al. ......................... 1/1 |
| 6,289,450 B1 | 9/2001 | Pensak et al. |
| 6,289,460 B1 * | 9/2001 | Hajmiragha ................... 726/28 |
| 6,314,425 B1 * | 11/2001 | Serbinis et al. ....................... 1/1 |
| 6,339,825 B2 | 1/2002 | Pensak et al. |
| 6,449,721 B1 | 9/2002 | Pensak et al. |
| 6,493,731 B1 * | 12/2002 | Jones et al. ................... 715/234 |
| 6,516,328 B1 * | 2/2003 | Mori et al. ................... 715/229 |
| 6,526,513 B1 * | 2/2003 | Shrader et al. .................... 726/4 |
| 6,578,053 B1 * | 6/2003 | Kidokoro et al. .................. 1/1 |
| 6,609,200 B2 * | 8/2003 | Anderson et al. ............ 713/176 |
| 6,694,434 B1 | 2/2004 | McGee et al. |
| 6,738,973 B1 * | 5/2004 | Rekimoto ...................... 718/104 |
| 6,751,670 B1 | 6/2004 | Patterson |
| 6,778,979 B2 * | 8/2004 | Grefenstette et al. .................. 1/1 |

(Continued)

OTHER PUBLICATIONS

PageRecall: The Key to Document Protection, Authentica, Inc. Whitepaper, http://www.authentica.com/products/white.

(Continued)

*Primary Examiner* — David García Cervetti
(74) *Attorney, Agent, or Firm* — Finch & Maloney PLLC

(57) ABSTRACT

The present disclosure includes systems and techniques relating to document access auditing. According to an aspect, the invention involves receiving a request relating to an electronic document associated with a document tracking system; retrieving actions-taken information associated with the electronic document and maintained by the document tracking system; combining and signing the electronic document and the actions-taken information to form a signed document that includes the actions-taken information; and providing the signed document to enable access to the actions-taken information independent of the document tracking system. According to another aspect, the invention involves presenting a consent query that requests consent to an audit event to be recorded by a document control system for an electronic document tethered to the document control system; receiving a consent indication with respect to a consent statement relating to the audit event; and sending information corresponding to the consent indication to the document control system.

27 Claims, 13 Drawing Sheets

U.S. PATENT DOCUMENTS

| | | | |
|---|---|---|---|
| 6,876,987 B2* | 4/2005 | Bahler et al. | 706/14 |
| 6,877,136 B2* | 4/2005 | Bess et al. | 715/209 |
| 6,895,503 B2 | 5/2005 | Tadayon et al. | |
| 6,920,507 B1 | 7/2005 | Kley et al. | |
| 6,957,384 B2* | 10/2005 | Jeffery et al. | 715/202 |
| 6,971,017 B2 | 11/2005 | Stringer et al. | |
| 7,085,741 B2* | 8/2006 | Lao et al. | 705/51 |
| 7,085,932 B1 | 8/2006 | Morgan, III | |
| 7,130,858 B2* | 10/2006 | Ciaramitaro et al. | 1/1 |
| 7,152,066 B2* | 12/2006 | Nelson et al. | 1/1 |
| 7,162,633 B2 | 1/2007 | Wang et al. | |
| 7,249,314 B2* | 7/2007 | Walker et al. | 715/205 |
| 7,284,191 B2* | 10/2007 | Grefenstette et al. | 715/230 |
| 7,299,502 B2 | 11/2007 | Schmeling et al. | |
| 7,395,436 B1 | 7/2008 | Nomevicher | |
| 7,640,505 B1* | 12/2009 | Edmunds | 715/744 |
| 7,698,230 B1* | 4/2010 | Brown et al. | 705/75 |
| 2001/0008557 A1* | 7/2001 | Stefik et al. | 380/202 |
| 2001/0013044 A1* | 8/2001 | Mori et al. | 707/511 |
| 2001/0018739 A1* | 8/2001 | Anderson et al. | 713/176 |
| 2001/0034738 A1* | 10/2001 | Cantwell et al. | 707/500 |
| 2002/0010679 A1* | 1/2002 | Felsher | 705/51 |
| 2002/0023057 A1 | 2/2002 | Goodwin et al. | |
| 2002/0095416 A1* | 7/2002 | Schwols | 707/10 |
| 2002/0109707 A1 | 8/2002 | Lao et al. | |
| 2002/0138280 A1 | 9/2002 | Drabo | |
| 2002/0161594 A1 | 10/2002 | Bryan et al. | |
| 2002/0184517 A1 | 12/2002 | Tadayon et al. | |
| 2002/0194014 A1 | 12/2002 | Starnes et al. | |
| 2003/0028495 A1 | 2/2003 | Pallante | |
| 2003/0069877 A1* | 4/2003 | Grefenstette et al. | 707/2 |
| 2003/0084105 A1* | 5/2003 | Wiley et al. | 709/205 |
| 2003/0105759 A1* | 6/2003 | Bess et al. | 707/9 |
| 2003/0130953 A1 | 7/2003 | Narasimhan et al. | |
| 2003/0149696 A1* | 8/2003 | Nelson et al. | 707/10 |
| 2003/0196087 A1 | 10/2003 | Stringer et al. | |
| 2003/0217008 A1* | 11/2003 | Habegger et al. | 705/51 |
| 2004/0021708 A1* | 2/2004 | Lay et al. | 347/5 |
| 2004/0039594 A1 | 2/2004 | Narasimhan et al. | |
| 2004/0049475 A1* | 3/2004 | Kidokoro | 707/1 |
| 2004/0049571 A1* | 3/2004 | Johnson et al. | 709/224 |
| 2004/0088313 A1 | 5/2004 | Torres | |
| 2004/0100363 A1* | 5/2004 | Lane et al. | 340/5.86 |
| 2004/0162737 A1* | 8/2004 | Ikeda et al. | 705/1 |
| 2004/0193597 A1* | 9/2004 | Johnson | 707/6 |
| 2004/0196307 A1* | 10/2004 | Zak et al. | 345/733 |
| 2004/0205205 A1 | 10/2004 | Patterson | |
| 2004/0205448 A1* | 10/2004 | Grefenstette et al. | 715/500 |
| 2004/0215618 A1 | 10/2004 | Wacke et al. | |
| 2004/0216039 A1 | 10/2004 | Lane et al. | |
| 2004/0225524 A1 | 11/2004 | Narasimhan et al. | |
| 2004/0225884 A1 | 11/2004 | Lorenzini et al. | |
| 2004/0267595 A1* | 12/2004 | Woodings et al. | 705/9 |
| 2005/0004951 A1* | 1/2005 | Ciaramitaro et al. | 707/104.1 |
| 2005/0022114 A1* | 1/2005 | Shanahan et al. | 715/513 |
| 2005/0038787 A1 | 2/2005 | Cheung et al. | |
| 2005/0097441 A1 | 5/2005 | Herbach et al. | |
| 2005/0114363 A1* | 5/2005 | Borthakur et al. | 707/100 |
| 2005/0114406 A1* | 5/2005 | Borthakur et al. | 707/200 |
| 2005/0138540 A1* | 6/2005 | Baltus et al. | 715/511 |
| 2005/0165935 A1* | 7/2005 | Moody et al. | 709/228 |
| 2005/0177389 A1 | 8/2005 | Rakowicz et al. | |
| 2005/0226261 A1 | 10/2005 | Varadarajan et al. | |
| 2005/0234909 A1 | 10/2005 | Bade et al. | |
| 2005/0256742 A1 | 11/2005 | Kohan et al. | |
| 2006/0056628 A1 | 3/2006 | Todd | |
| 2006/0190734 A1 | 8/2006 | Spitz | |
| 2006/0218643 A1 | 9/2006 | DeYoung | |
| 2007/0198563 A1 | 8/2007 | Apparao et al. | |

OTHER PUBLICATIONS

Meehan, Thomas, Deploying Hummingbird Document and Records Management Products to Comply with 21 CFR Part 11: Electronic Records; Electronic Signatures, Apr. 2003, Hummingbird.

* cited by examiner

DOCUMENT ACCESS AUDITING

CROSS REFERENCE TO RELATED APPLICATION

This application is a divisional of and claims the benefit of the priority of U.S. patent application Ser. No. 10/931,323, filed Aug. 31, 2004 now U.S. Pat. No. 7,707,642, and entitled "Document Access Auditing"; the prior application is hereby incorporated by reference.

BACKGROUND OF THE INVENTION

The present application describes systems and techniques relating to document tracking, for example, performing document access auditing in a document control system.

Traditional document control systems have included servers that store and manage encryption keys for documents secured by the system, providing persistent protection for documents by requiring the server to be contacted before a secured document can be opened. Such systems have also provided offline capabilities by caching a cryptographic document key on a client to allow the client to open a document for a limited time when the user is offline, provided the document is first opened while online. Such systems have also been able to log document access information, including caching of log information while offline, for use in auditing document access.

Conventional document management systems have included document permissions information associated with documents that allow different groups of individuals to have different permissions, and conventional document viewing software applications have also included software plug-ins designed to translate document permissions information from a document management system format to a format used by the software application, i.e., a separate software plug-in required for each integration with a document management system. The eXtensible Rights Markup Language (XrML™) allows a document viewing application to understand resources and permissions from any system that complies with the XrML rules (XrML is a trademark of ContentGuard Holdings, Inc.). Moreover, document viewing applications have also enabled digital signing of a document with a user's private key, at the user's direction, to indicate consent to terms included in the document, and the XML Data Signatures specification (developed jointly by the Internet Engineering Task Force (IETF) and the World Wide Web Consortium (W3C)) allows signing of various data portions in a document.

Many different encryption schemes have been used to secure documents. These have included symmetric encryption on a per-document basis, requiring individuals to remember passwords for individual documents, and combined asymmetric-symmetric encryption schemes (e.g., Pretty Good Privacy (PGP™) encryption) that provide the ability to decrypt multiple documents based on the user's single password. In the network multicast/broadcast context, various encryption protocols have also been used that cache encryption keys on clients. Many software products directly integrate with existing enterprise authentication systems (e.g., Lightweight Directory Access Protocol). Moreover, various systems have also provided functionality to allow users to find the most recent version of a distributed document, such as the Tumbleweed Messaging Management System™, which secures e-mail systems and can send a recipient of an email with an attached document an email notification when the original version of the attached document is updated, where the email notification has a URL (Universal Resource Locator) link back to the current document.

Additionally, both document management systems and document control systems have included document access tracking functionality, where document access information is recorded in a central location and used in auditing document access. Enabling a user to generate an audit of actions performed on a document that has been tracked by a system can have substantial benefits.

SUMMARY OF THE INVENTION

In general, in one aspect, the invention features operations including receiving a request relating to an electronic document associated with a document tracking system; retrieving, in response to the request, actions-taken information associated with the electronic document and maintained by the document tracking system, the actions-taken information comprising information stored separate from the electronic document and describing actions taken with respect to the electronic document; combining and signing the electronic document and the actions-taken information, in response to the retrieval, to form a signed document that includes the actions-taken information; and providing the signed document to enable access to the actions-taken information independent of the document tracking system.

According to another aspect, the invention features operations including presenting a consent query that requests consent to an audit event to be recorded by a document control system for an electronic document tethered to the document control system, wherein the document control system provides persistent document security for documents tethered to the document control system; receiving, in response to the presented consent query, a consent indication with respect to a consent statement relating to the audit event; and sending information corresponding to the consent indication to the document control system, the consent indication information configured to be included with actions-taken information relating to the electronic document.

The invention can be implemented to realize one or more of the following advantages. Audit information for documents of interest can be made available even if the document tracking system responsible for generating and maintaining the audit information becomes decommissioned or otherwise unavailable. In the context of a document control system, a non-secured document can be produced that is identical to the source document but with an appendix that describes audited events and various aspects of the document's life cycle through the document control system. The document can be published and/or archived as a free-standing document with audit history that, when signed by a document control server, extends the system's auditing guarantees outside the realm of the document control system.

The invention can facilitate use of a document approval workflow, allowing one or more authenticated users to authorize a document or aspect of a document within the document tracking system. Such authorization(s) can then be added to the document using the techniques described, thus allowing use of an online workflow process, while not requiring recipients of the approved document to have access to the document tracking system in order to verify that the appropriate approval(s) have been recorded. Additionally, consent-based auditing can provide a better guarantee that a user has actually read a document, understands, and/or agrees to it.

The details of one or more embodiments of the invention are set forth in the accompanying drawings and the descrip-

BRIEF DESCRIPTION OF THE DRAWINGS

Like reference symbols in the various drawings indicate like elements.

DETAILED DESCRIPTION

The systems and techniques described can be implemented in a document tracking system, which is a computing system that records actions taken with respect to tracked documents. Examples include a document control system, such as described in detail below, or a document management system with a notion of auditing, such as the Documentum® content management system provided by Documentum, Inc. of Pleasanton, Calif. The systems and techniques described can be used to realize a document control system, such as may be used by an enterprise in connection with document management. The document control system can operate as a stand-alone system or as a component of another system. The document control system can provide persistent document security by controlling who can view documents and what can be done with them, regardless of where the document resides.

In this application, the terms "document" and "electronic document" mean a set of electronic data, including both electronic data stored in a file and electronic data received over a network, which can be represented as a single document icon in a graphical user interface of an operating system (OS) or software application. An electronic document does not necessarily correspond to a file. A document may be stored in a portion of a file that holds other documents, in a single file dedicated to the document in question, or in a set of coordinated files. Additionally, in this application, the term "periodically" means recurring from time to time, and does not require regular intervals.

The systems and techniques described can be used with many different types of documents, including, for example, Portable Document Format (PDF) documents. PDF documents are in a format originated by Adobe Systems Incorporated of San Jose, Calif. A PDF document is an example of an electronic document in a platform-independent document format that can define an appearance of the electronic document. This document format can be a platform independent storage format capable of storing many different types of data, including graphics, animation and sound, and the defined appearance can be defined for multiple types of display devices, providing a document originator with control over the look and feel of the document regardless of the final destination device. Using documents in this type of format with the techniques described can result in additional advantages for the resulting systems. For example, the document control system can have an architecture that is not tied to a particular software development platform (e.g., the system can be designed to run on both Java and .NET), and can use platform-independent documents, such as PDF documents. Thus, the document control system can readily function across several platforms.

Figure 1:
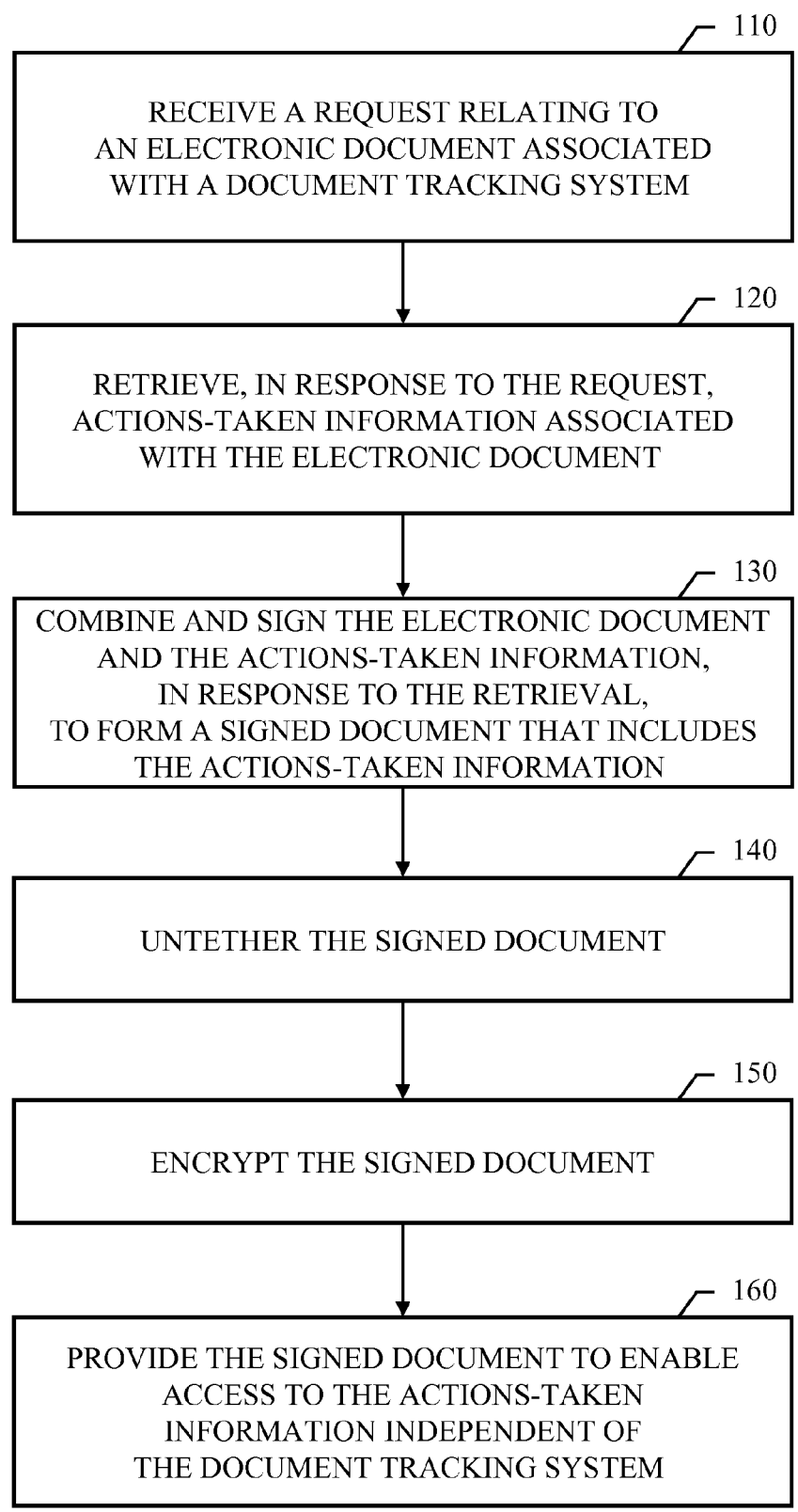
FIG. 1 is a flow chart illustrating generation of an audit-enabled document.

FIG. 1 is a flow chart illustrating generation of an audit-enabled document. A request relating to an electronic document associated with a document tracking system is received at 110. Prior actions taken with respect to the document have been tracked and stored by the document tracking system (e.g., an audit log stored in a central location such as a relational database). The request can be generated by a client and sent to a server. The request can be generated at the behest of a user who would like to obtain an audit-enabled copy of a document, and/or the request can be generated by a machine as part of an automatic document publishing and/or archiving system.

In response to the request, actions-taken information associated with the electronic document and maintained by the document tracking system is retrieved at 120. The actions-taken information includes information stored separate from the electronic document and describing actions taken with respect to the electronic document. These actions can include multiple types of audited events, such as opening the document (which can be inferred in the document control system described below from receipt of a key to decrypt the document), printing the document (which can be inferred from selection of a print command from a menu), revoking the document, requesting an audit history associated with the document, and indicating authorization of the document. Moreover, retrieval of the actions-taken information can involve using a database query to retrieve a subset of all actions-taken information available for the document, and/or retrieving actions-taken information associated with a project with which the document is associated (the document can be a project document, or a portion of a project document, having multiple sub-documents associated with a project).

In response to the retrieval, the electronic document and the actions-taken information are combined and signed to form a signed document that includes the actions-taken information at 130. In this application, the term "signing" refers to computing-based method of digitally signing a set of data. For example, the electronic document and the actions-taken information can be combined, and a cryptographic checksum (e.g., a hash or fingerprint) of the electronic document, with the actions-taken information included, can be generated. A digital signature of the cryptographic checksum can then be produced (e.g., encrypting the cryptographic checksum with a private key in an asymmetric encryption scheme), and that digital signature can be added to the electronic document to form the signed document.

The combining and signing can be performed in different orders and can involve multiple combining and/or multiple signing operations. For example, the actions-taken information can be signed first, the electronic document and the signed actions-taken information can be combined, and then the electronic document, which now includes the signed actions-taken information, can be signed again. Combining of the electronic document and the actions-taken information can involve embedding the actions-taken information within the document or appending the actions-taken information to the document. Moreover, the signing operations can involve multiple keys or a single key, such as signing with a private encryption key associated with a document control system.

In the context of a document control system, the signed document can be untethered from the system at 140. A tethered document is one for which access to the document is controlled by the document control system. An untethered document is one for which the document control system no longer controls access to the document. The untethered document may still be linked to the document control system in that a document viewing application may still attempt to contact the system upon one or more access events, but the document will still be accessible even if the document control system has been decommissioned or is otherwise currently unavailable.

The signed document can be encrypted at 150. For example, the document can be archived in an encrypted manner, and the key stored in escrow, if the content remains sensitive. The document can be encrypted with a document control system key, such as the document key used in the document control system described below, that is then held in escrow. Alternatively, the signed document can be unencrypted such that anybody (e.g., a court) can easily see the history of the document.

The signed document is provided to enable access to the actions-taken information independent of the document tracking system at 160. This can involve providing the signed document to support generation of an audit of the actions-taken information independent of the document tracking system. This can also involve publishing and/or archiving the signed document. For example, the document can be archived in a secured storage location (e.g., a data repository with access restrictions). Signed incremental updates can be performed on an archived document. Periodic signing of the audit information can help to ensure authenticity and prevent tampering. For example, an archived and signed document can be updated by adding new audit events as an incremental signature. Signing the document by an incremental signature can involve taking the previous hash and a hash of the incremental information, generating a hash of these two hashes together, and then signing the resulting hash. Thus, a chain of digital signatures can be formed that links all the actions-taken information together in the archived document.

The operations illustrated in FIG. 1 can be performed by a server, which can be part of the document tracking system or a separate server that interacts with the document tracking system. The document tracking system can be a document control system, in which the system only grants access to a tethered document once the user has authenticated and the system determines what actions should be allowed by the client for the authenticated user.

Figure 2:
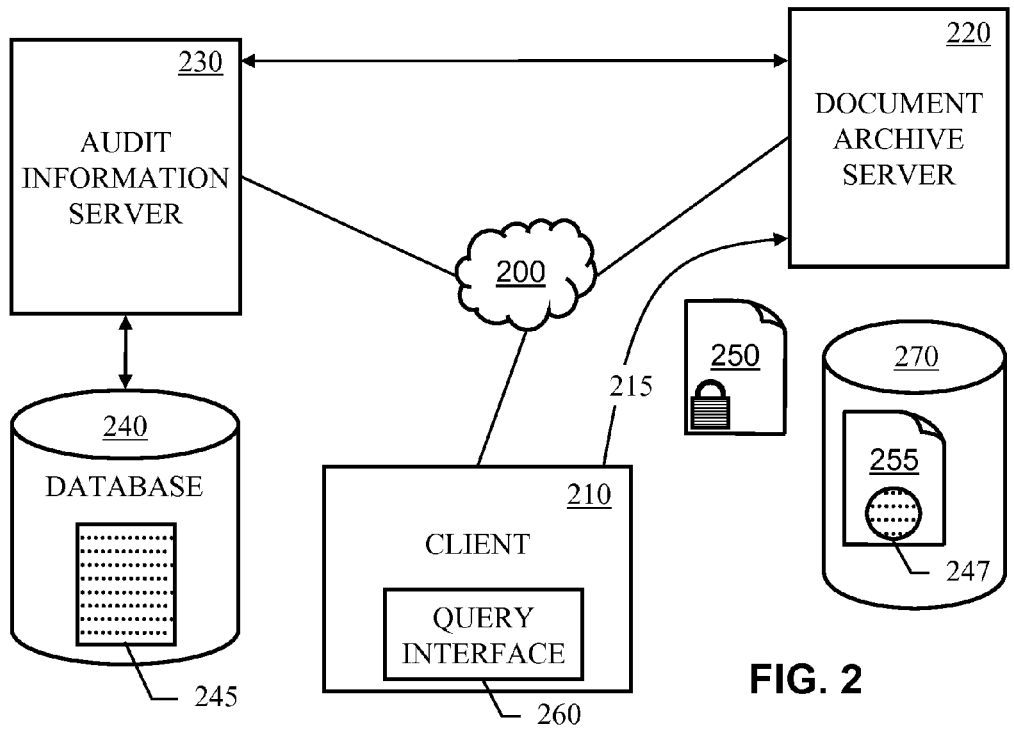
FIG. 2 is a block diagram illustrating generation of an audit-enabled document.

FIG. 2 is a block diagram illustrating generation of an audit-enabled document. A client 210 is communicatively coupled with a document archive server 220 over a network 200. An audit information server 230 is communicatively coupled with the document archive server 220 over the network 200. The audit information server 230 is also communicatively coupled with a database 240 (potentially over the network 200 as well, or the database 240 may be part of the audit information server 230). The audit information server 230 and the database 240 can be part of a document tracking system. For example, the audit information server 230 can be a document control server as described below. The document archive server 220 can also be part of the document tracking system, or part of a third party system.

The client 210 sends a request 215 to the document archive server 220. The request 215 relates to a document 250, which is a secured document in a document control system implementation. The request 215 can include a database query to be applied against the database 240. The database query can be a query reference number that identifies one of a set of pre-defined queries, or the database query can a structured query language (SQL) query constructed using a query builder user interface 260.

The document archive server 220 communicates with the audit information server 230 to retrieve a subset of all the actions-taken information 245 associated with the electronic document 250. The document archive server 220 also obtains a copy of the document 250, such as from the client 210 or from a document repository. In a document control system implementation, the obtained document 250 may already be untethered, or the document archive server 220 may untether the document 250. The subset 247 of the actions-taken information, such as defined by the database query, is added to the document to form a signed document 255, as described above. Then the document 255 can be sent to the client 210, published and/or archived in a secured storage location 270 as desired.

The resulting document 255 is audit-enabled in that it contains specified audit information for the document in a single document package, such that the document's audit history can be accessed even when the document tracking system is not operational. The actions-taken information included in the document 255 can include information related to authenticated user interactions with the electronic document. This information can include an indication of authorization by an authenticated user obtained as part of a document approval workflow. Moreover, this information can also include audited consent statements.

In a document control system, audited events can be extended to include consent-based events. In consent-based auditing, a user is asked to consent to what is being audited. A server can explicitly ask a user to read a short statement describing what he is agreeing to (e.g., "I have read and understood . . . " or "I agree to the terms . . . "). After the authenticated user agrees, this information can be transmitted back to the document control server, and thus the user's consent to the audit (or lack thereof) is also an audited event and made part of the actions-taken information for the document. Additionally, the short statement can be digitally signed with the user's private key, when available, providing a higher level of authenticity describing what was actually agreed to. The digitally signed statement can be stored in the document control server's audit record.

Figure 3:
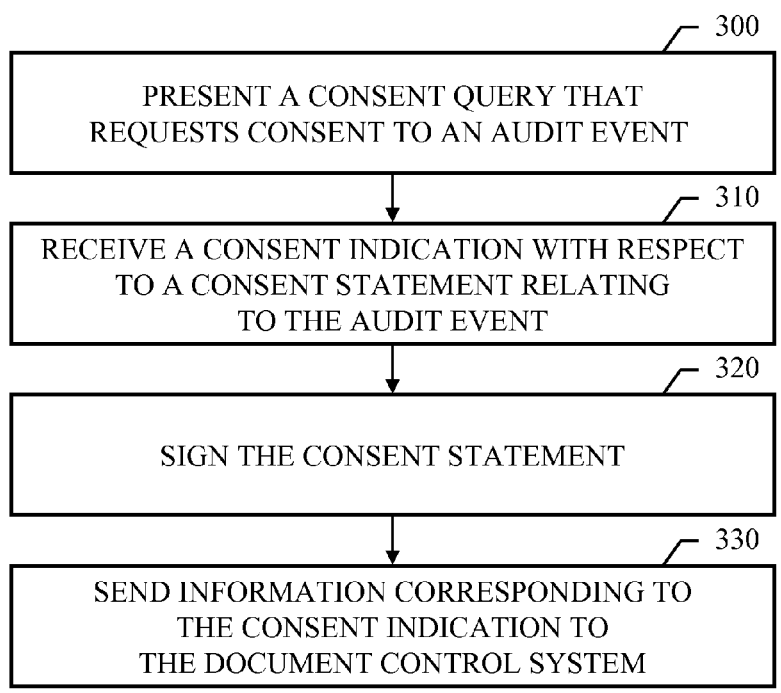
FIG. 3 is a flow chart illustrating consent-based auditing.

FIG. 3 is a flow chart illustrating consent-based auditing. A consent query that requests consent to an audit event to be recorded by a document control system for an electronic document tethered to the document control system is presented at 300. Presentation of the consent query can occur in response to receiving a request for consent from a document control server, which in turn can occur in response to a user interaction with the electronic document. For example, when a user views a document, the server can periodically ask the user to consent to specific auditing actions. If the system is configured such that it is suggested, but not required, that the user consent, then the user experience would allow, but not require, a user to select an element in the user interface to see what he is being asked to agree to (e.g., a button on a toolbar can initiate this process). If the server is configured to force the user into consenting to the terms of the auditing, the server can warn the user before the document is opened (and decrypted), and then forcibly ask the user to agree to terms when the document is scrolled to a new page, or after a set amount of time. The system can also be configured to preclude future decryption of the document unless the user agrees to the terms.

Presenting the consent query can involve opening a dialog that includes the specific agreement that the user should consent to. By checking a box in the dialog and authenticating with the server, the server can then use the auditing techniques described herein to audit this consent-level event.

In response to the presented consent query, a consent indication with respect to a consent statement relating to the audit event is received at 310. The consent statement can be a statement entered by the user, or the consent statement can be provided by the system. The document control server can have a predefined notion of what is to be audited and what statements are to be used. The consent query can include a predefined list of consent statements, and receiving the consent indication can involve receiving a selection from the predefined list of consent statements.

The consent statement can be signed at 320. This can result in a higher level of authenticity in that it may give a better guarantee that the specific user actually consented to the audit. Information corresponding to the consent indication is sent to the document control system at 330. This consent indication information is configured to be included with actions-taken information relating to the electronic document. The consent indication information can include the digitally signed consent statement, which can be stored in an audit log accordingly. Moreover, the consent indication information can be used by the document control system to alter one or more permissions associated with the electronic document. For example, certain permissions can be enabled in response to user's consent, or certain permissions can be disabled in response to the user's lack of consent.

Figure 4:
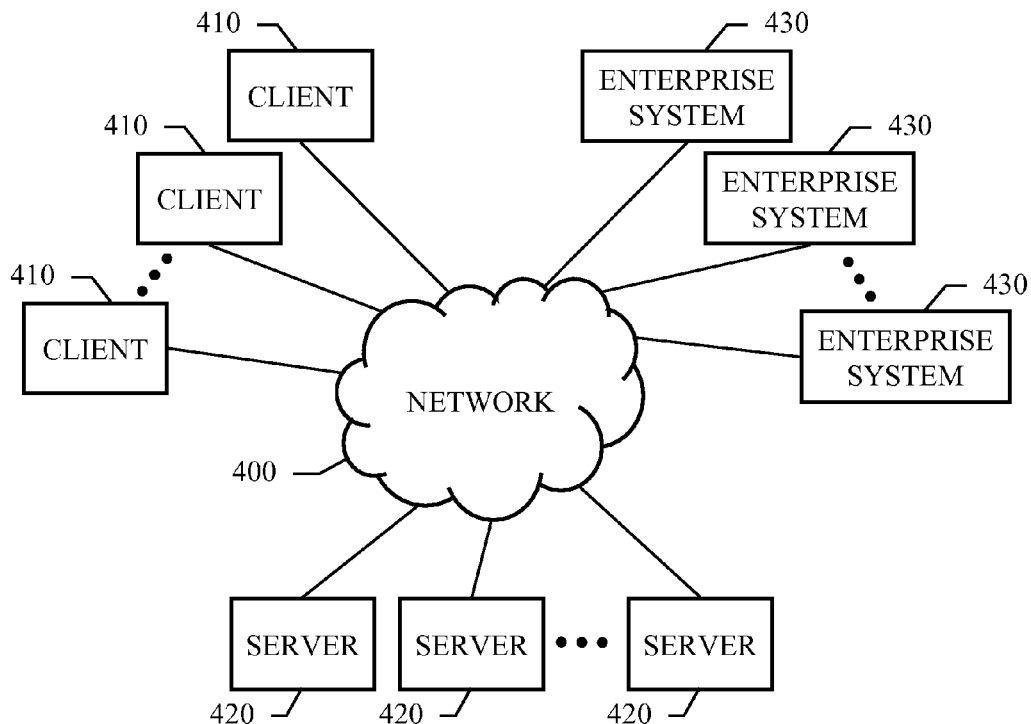
FIG. 4 is a block diagram illustrating an operational environment for a document control system.

The following description provides details of a document control system in which the above systems and techniques can be implemented. FIG. 4 is a block diagram illustrating an operational environment for a document control system. A network 400 provides communication links between one or more clients 410, one or more servers 420, and one or more enterprise systems 430. The network 400 may be any communication network linking machines capable of communicating using one or more networking protocols, including a local area network (LAN), metropolitan area network (MAN), wide area network (WAN), enterprise network, virtual private network (VPN), and/or the Internet. A client 410 can be any machine(s) or process(es) (e.g., a Web browser on a personal computer) capable of communicating over the network 400 with a server 420, and the server 420 can be any machine(s) or process(es) capable of communicating over the network 400 with an enterprise system 430. Moreover, the client(s) 410 can also communicate with the enterprise system(s) 430.

The enterprise system(s) 430 can be a storage system, an authentication system, a communication system, and/or a document management system. The server(s) 420 can be designed to tightly integrate with existing enterprise system(s) 430 and leverage existing enterprise infrastructure. For example, the server(s) 420 can provide rich support for user and group information in enterprises, where such information may come from multiple sources, as is common in large companies that have been involved in recent mergers. The server(s) 420 can provide document security while being minimally obtrusive, making the system easier to use and thus easier to deploy effectively. For example, the server(s) 420 can implement a document control system that provides a sophisticated offline-access mechanism, as described further below, that allows users to view documents while offline, even if they have not previously viewed the document while online. Thus, the document control system can maintain a low-profile during normal operation, making the presence of document security less visible, and thus more usable.

Figure 5:
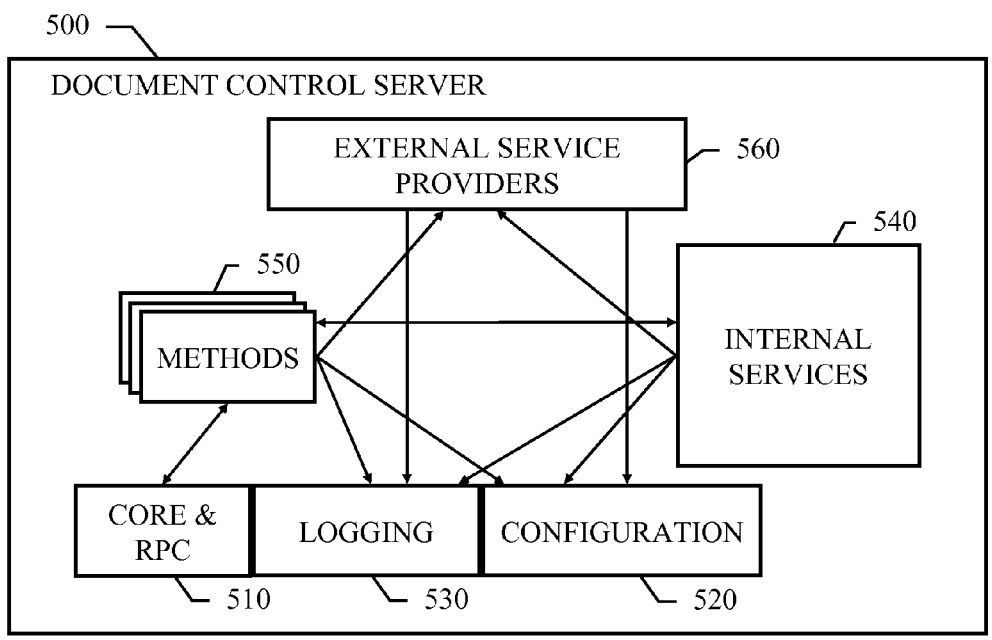
FIG. 5 is a block diagram illustrating an example document control server.

FIG. 5 is a block diagram illustrating an example document control server 500. The document control server 500 can include a server core 510 with configuration and logging components 520, 530. The server core 510 can provide a remote procedure call (RPC) interface to the clients that contact the server 500. An internal services component 540 can provide functionality across methods 550. Other components of the server 500, including the methods 550 and external service providers 560, can be dynamically loaded based on information provided by the configuration component 520. The methods 550 can specify the functionality that the server 500 exports to the clients (e.g., secure a document, execute an audit query, etc). The external service providers 560 can specify external facilities that are available to the methods 550 (e.g., storing data, authenticating users, etc).

The configuration component 520 can define an interface to a configuration object, and the logging component 530 can define an interface to a logging object used by the server 500 to log a wide variety of information. The configuration object can be a server configuration file (e.g., a ".ini" file read by the server 500), and the logging object can be a log file (e.g., a text file). Alternatively, the configuration object and the logging object can be local or remote objects defined using a standardized interface (e.g., the java standards JMX (java management extension) and log4j, respectively).

The RPC interface provided by the server core 510 can be used to present a method interface to the clients: a client can call each named method through the RPC interface, providing an appropriate set of arguments. The server 500 can initialize itself by reading a set of method classes that export the server method interface and define the methods that the server 500 will make available to clients. The internal services 540 can be internal components of the server that are used across all of the methods 550. These can be statically defined and/or dynamically loaded as dependencies of methods. The internal services 540 can include cryptography components, document securer processes, and an access control evaluation and creation infrastructure.

The methods that the server 500 exports to clients may depend on additional services with implementations that are dependent on a backend infrastructure of an enterprise system environment. The external service providers 560 can define a set of service provider interfaces that specify the connection(s) between the methods 550 and their execution environment. Upon initialization, the server 500 can load and initialize the set of service providers that are needed for this environment. The external service providers 560 can include default implementations and can be added to over time with additional implementations, tailored to different backend infrastructures, using the included service provider interfaces.

Example service providers are discussed below, but additional or alternative service providers are also possible. The definitions of the service providers are given in terms of interfaces that the service providers implement. These interfaces can be defined generically so that they can be implemented across a wide variety of systems. Thus, information that crosses system boundaries can be defined in simple terms to provide greater flexibility in implementation on various systems.

An authentication service provider can be used to authenticate a user. In the context of computer security, authentication is the procedure by which a programmable machine confirms the identity of another machine, and/or the other machine's current user, from which a communication has been received. There are many types of systems in which authentication can be used, and there are many types of events that can trigger an authentication process, depending on the needs of a particular implementation. The authentication systems and techniques described herein can be used in a document control system as described, or in other systems.

Figure 6:
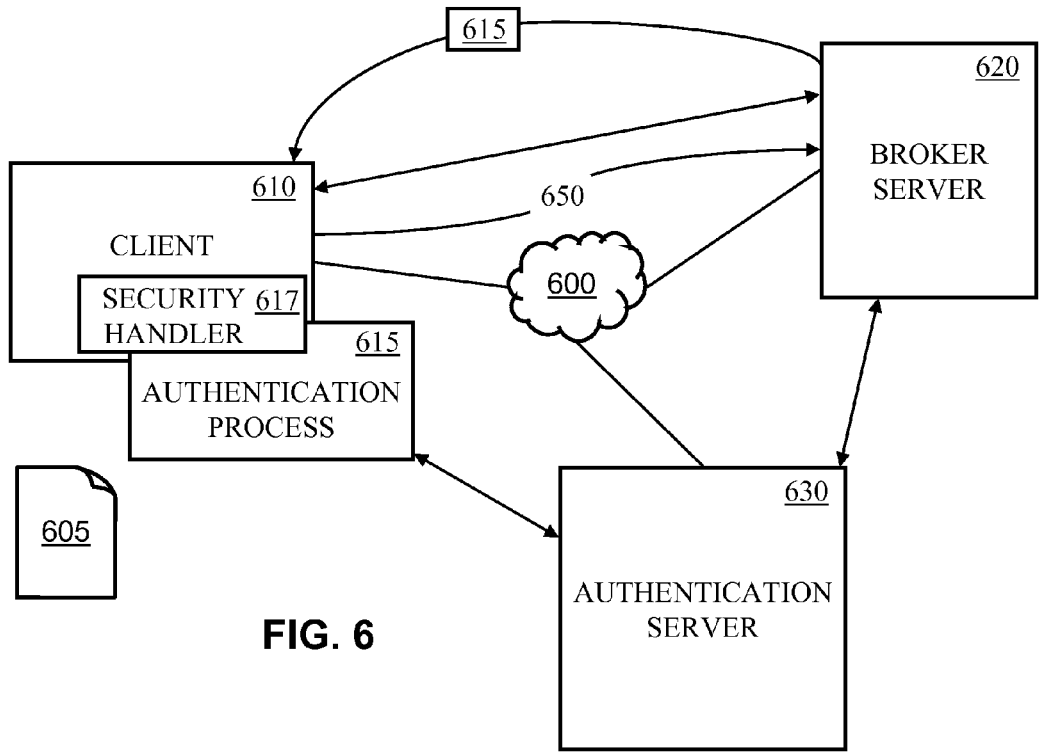
FIG. 6 is a block diagram illustrating workflow in an authentication system.

FIG. 6 is a block diagram illustrating workflow in an authentication system. A client 610 can be communicatively coupled with a broker server 620 over a network 600. When the client 610 needs to take an action that depends on having an authenticated user, the client 610 can send a request 650 to the broker server 620. For example, when the client 610 needs to take an action with respect to a document 605, the client 610 can send the request 650. The request 650 can indicate to the server 620 that an update concerning the currently approved authentication process, for use in connection with the action, is expected by the client 610. The request 650 can include information indicating the action and/or one or more authentication processes already resident in a location local to the client 610; and the server 620 can determine, based on this received information, whether to respond to the client's request by sending an authentication process for use by the client 610.

Additionally, the request 650 can represent multiple communications between the client 610 and the server 620. The client 610 can first communicate to the server 620 that the action has been requested, and the client requests to know whether authentication is to be performed, and if so, how authentication is to be performed. The information identifying the server 620 and the document 605 can be included in the document itself, and the server 620 can determine whether user authentication is needed based on the information identifying the document 605 and the nature of the requested action. The server 620 can respond as to whether authentication is needed, and if so, the type of authentication to be used, including potentially multiple types of acceptable authentication mechanisms, from which the client 610 can choose which one to use. If the client 610 does not already have the specified authentication functionality, the client 610 can then request a corresponding authentication update.

The server 620 can be a dedicated authentication broker server, or the server 620 can provide other resources as well. For example, the server 620 can be a document control server as described herein, and various client-initiated operations (e.g., document viewing, revoking and securing) can effectively also be server-based operations in that completion of these operations may require contacting the server; such server-based operations initiated by a client can also trigger authentication using a dynamically delivered authentication process.

The server 620 can respond to the request 650 by obtaining an authentication process 615 and sending the authentication process 615 to the client 610. The authentication process 615 can be stored by the server 620 or by another server (e.g., a server in an enterprise system). Thus, authentication components can reside at the client 610, on the server 620, and optionally on a separate authentication server. Authentication can be handled over a service provider interface that allows the server 620 to be configured to use an existing enterprise authentication mechanism (e.g., password-based authentication), or even to implement a custom authentication mechanism that may be developed later (e.g. a biometric authentication, or a new smart card system). The authentication service provider interface can define the methods that the server 620 uses to authenticate a user, and authentication service providers can be implemented for Windows and LDAP (Lightweight Directory Access Protocol) authentication, and also for one or more document management systems, such as authentication using the Documentum® Login Manager in the Documentum® content management system.

The authentication process 615 represents a software program having instructions operable to cause a machine to perform operations effecting an authentication procedure. The authentication process 615 can become a component of the client 610 upon receipt or stand alone and communicate with the client 610. The authentication process 615 can be a plug-in to a document viewing application, such as the ADOBE ACROBAT® software provided by Adobe Systems Incorporated of San Jose, Calif. The authentication process can use an existing interface provided by the client 610 to communicate authentication information to the server 620 (e.g., the document viewing application can include a security handler component 617 that communicates with the authentication process 615, such as described further below). The authentication process 615 can be a client authentication library (e.g., a package of shared software, such as a dynamic link library (DLL)) or a server service provider.

Thus, the client 610 can be transparently updated with a new authentication process as a result of sending the request 650 to the server 620. The specific mechanism(s) of authentication is therefore configurable, and end-to-end delivery of authentication components can be performed without the user being aware of the update. If an administrator changes the authentication procedure to be used for a document, all clients that attempt to perform an action that requires the specified authentication with respect to that document can be automatically and transparently updated to be able to authenticate using the newly specified mechanism. An authentication procedure can even be changed between sequential actions on a document, and thus a new request 650 can result in a new authentication process 615 being delivered for the same action to be performed on an already delivered document.

The authentication process 615 can implement an authentication procedure at the location of the client 610, interfacing and controlling any local hardware as needed (e.g., a biometric authentication procedure using biometric reading device), and the authentication process 615 can use an interface provided by the client 610 to communicate authentication information back to the server 620. The authentication process 615 can implement a wide variety of different authentication procedures, including multi-level and/or multi-factor authentications depending on the action being attempted. Because the authentication process 615 can be dynamically delivered in response to each request, an organization can readily change authentication procedures, adding new security features to a document control system as needed.

The authentication process 615 can query a user at the client 610 for input (e.g., text, biometric data, etc.), encode the received input, and return the encoded input to an authentication provider on the server 620 (e.g., send the encoded input to the security handler 617 in the client 610, which forwards the information to the server 620). The server 620 can then handle authentication, either directly on in conjunction with an authentication server 630. In this pass-through authentication mechanism, the client 610 can provide credentials to the server 620, and the server 620 can work with a third party authentication system, such as LDAP or RADIUS to authenticate the user. If authentication is successful, the authentication service provider can return an authenticated username.

Additionally, the server 620 need not be able to directly interpret client authentication information. Instead of the client 610 giving credentials directly to the server 620, the client 610 can first authenticate and then provide some resulting information to the server 620 to allow the server 620 to re-verify that the client 610 previously authenticated. For example, the authentication process 615 can contact the authentication server 630 to authenticate the user directly, and a receipt of authentication can be returned to the server 620. The server 620 can pass the receipt to the authentication server 630 and verify that there was in fact a successful authentication. Thus, the client 610 can provide credentials to a separate authentication system directly and then provide an authenticated token to the server 620, which can be used to verify the user's identity with the separate authentication system.

The server 620 can use multiple authentication service providers. The server 620 can dynamically deliver one or more authentication processes 615 to the client 610, as needed, using the interface described below. Such authentication process(es) 615 can be delivered securely to the client 610 and spoofing can be prevented, e.g., as described below in connection with secure code library loading. The client 610 can also have one or more default authentication processes already available, such as an authentication library that can capture username-password text entry. Such default authentication process(es) can include support for user interface (UI) customization and a standard format for extracting this information within authentication service providers. Moreover, the client 610 can retain credentials for a period of time so that a user need not logon each time they perform an operation. An example of such retaining of client credentials to support offline access is described further below in connection with FIGS. 14-17.

Secure code library loading can be implemented to all the server(s) 620 to push one or more authentication libraries (e.g., DLLs, java bytecode, javascript, etc.) to clients to provide updates or customize clients without requiring any action (or knowledge) on the part of the user while also preventing these authentication libraries from being spoofed on the client (e.g., by a Trojan horse program). A mechanism can be provided to verify the authenticity of the authentication libraries downloaded from the server 620. When the server 620 pushes an authentication library to the client, the server 620 can compute a hash of the library and also send this hash to the client 610, and/or the server 620 can sign the authentication library before sending it to the client. The hash can be retained locally at the client, and the client 610 can ensure the authentication library is valid by computing a hash of the authentication library and verifying it against the retained value at load time. Additionally, a selected set of libraries can be signed by the provider, or all the libraries can be signed by the provider, and the provider's public key can be retained at the client 610 (e.g., a DLL can be signed by Adobe when the client 610 is the ADOBE ACROBAT® software with the Adobe public key included).

Figure 7:
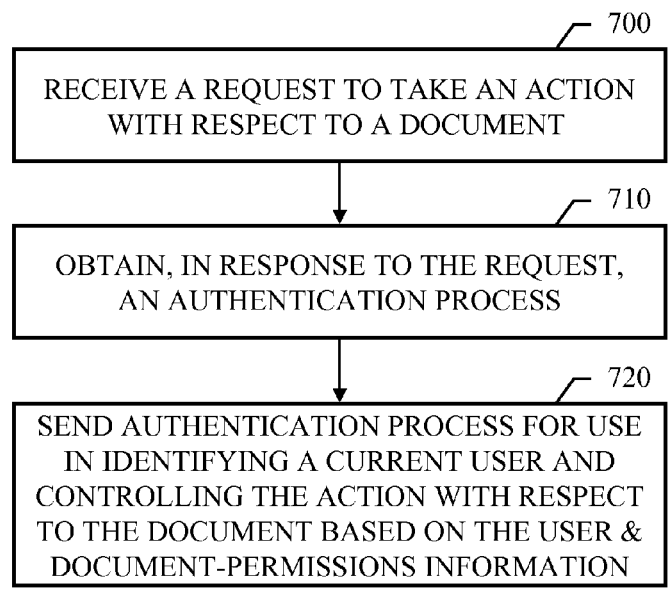
FIG. 7 is a flow chart illustrating an authentication technique employed by a server.

FIG. 7 is a flow chart illustrating an authentication technique employed by a server. A request to take an action with respect to a document is received at 700. In response to the request, an authentication process is obtained at 710. The authentication process is sent to the client, at 720, for use in identifying a current user and controlling the action with respect to the electronic document based on the current user and document-permissions information associated with the electronic document. Thus, the authentication mechanism can be specified on the server and the appropriate code can be downloaded to the client dynamically, as needed, in a manner that is transparent to the client.

An authentication interface can provide either a text-based username-password description or a single authentication library. This can be implemented using two types of methods for authentication. The first method can take an opaque token (e.g., an uninterpreted byte string) as well as a username, although the implementation can choose to ignore either. The second method can take a username, password and optionally a third argument, which can specify the "domain", or a "connect string" if desired. The authentication provider can implement its own defense against brute force attacks, and can have the option to deny authentication even if the correct credentials are presented.

Implementations can also return an authentication reply that specifies whether the user successfully authenticated (verified). If verified is false, an additional error message indicating why it was not verified (e.g., no such user) can be returned; this error message need not be returned to the client, but can just be logged on the server (so as not to provide the client with helpful information that could be used to crack the authentication system). A token to be used in future authentication attempts can also be returned, although the server can ignore this. The username should also be returned for verified attempts such that the server can understand who has authenticated. The access control list (ACL) service provider should be able to take this username and canonicalize it. The canonical form of the username corresponds to a defined format that allows consistent use of usernames across workflows; the definition(s) governing canonical form(s) in the system can vary with implementation.

Because the client can authenticate using multiple methods, the server should be able to describe how the client should attempt to authenticate by default, or if authentication failed, what method to attempt next. The authentication service provider can describe how authentication should occur—e.g., using a specific code library or a basic text entry dialog being displayed to the user. If a code library is to be used, the server can communicate metadata about the code library to the client (e.g., a DLL's name, size, etc.). If a basic text entry dialog is used, the server can specify what the UI should look like to the user—e.g., the title should say "Please enter your company LDAP password", and that only two fields, "username", and "password" are required.

In addition to the authentication systems and techniques described, document control systems and techniques can be provided. These can be combined with the described authentication or used separately.

Figure 8:
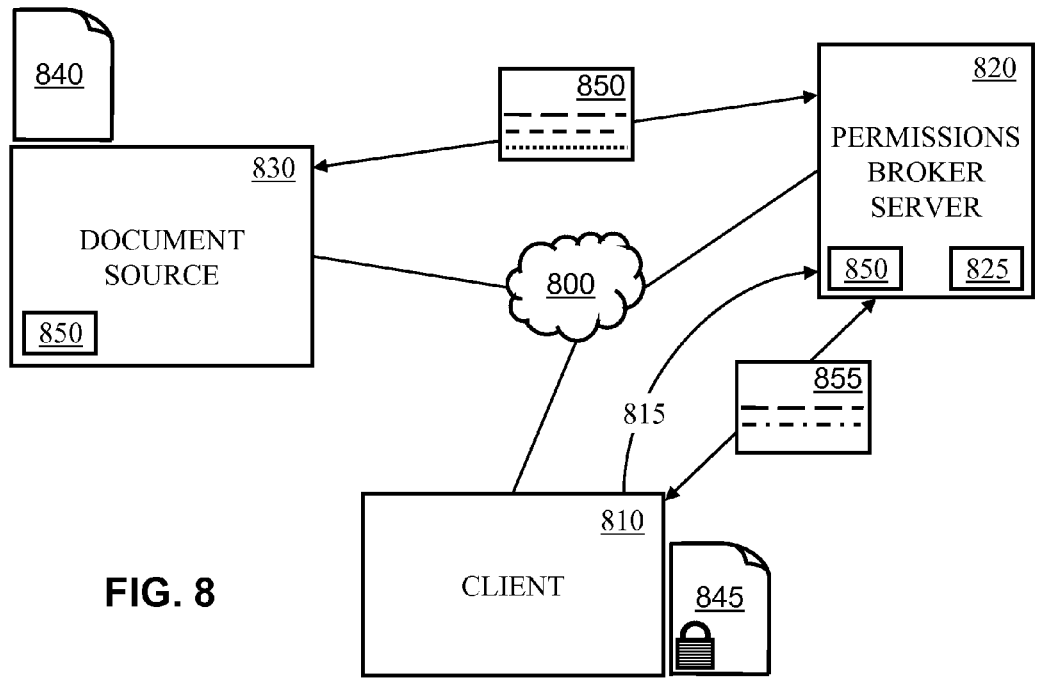
FIG. 8 is a block diagram illustrating workflow in a document control system.

FIG. 8 is a block diagram illustrating workflow in a document control system. A client 810 can be communicatively coupled with a permissions-broker server 820 over a network 800. A document source 830 can also be communicatively coupled with the permissions-broker server 820 over the network 800. The document source 830 can be a document repository (e.g., a document management system or a file system) and/or a document handling system (e.g., an email system). In general, the document source 830 can be considered one of two types: (1) a document source where a document 840 should be expected to be retained and accessible in the future, and (2) a document source where a document 840 should not be expected to be retained and accessible in the future (although it may be in practice).

When the document source 830 is of the first type, document-permissions information 850 can be retained at the document source 830 and sent to the permissions-broker server 820 when needed. Thus, the document-permissions information 850 need not be retained at the permissions-broker server 820 (although such information can be retained at the server 820 in a permissions-definition format specified for the server 820). When the document source 830 is of the second type, the document-permissions information 850 can be generated at the document source 830, at the permissions-broker server 820, or at the client 810, when the document 840 is secured to create a secured document 845, and the document-permissions information 850 can be retained at the permissions-broker server 820. The document-permissions information 850 can be an ACL that defines the types of actions that are authorized for the document 840. Moreover, document-permissions information can specify access permissions at a level of granularity smaller than the document itself (e.g., controlling access to specific pages, paragraphs and/or words in the document).

The secured document 845 can be encrypted using an encryption key generated by the permissions-broker server 820, and the secured document 845 can include information identifying the server 820 and the document 845 (e.g., a link to the server 820 and a document identifier that is unique within the context of the server 820). The secured document 845 can be delivered to the client 810 in any manner (e.g., email, download from a document repository, received on a compact disc, etc.), and the secured document 845 can be a copy of another secured document (e.g., an attachment to an email forwarded from another source).

When the client 810 needs to take an action with respect to the secured document 845, the client 810 can determine that the document 845 is secured, extract the information identifying the server 820 and the document 845, and send a request 815 to the server 820 corresponding to the action and including the document identifying information. In response to this request, the permissions-broker server 820 can translate the document-permissions information 850 into second document-permissions information 855. The second document-permissions information 855 can be sent to the client 810 to govern the action with respect to the document 845 at the client 810. The client 810 can be a document viewing application, e.g., the ADOBE ACROBAT® software provided by Adobe Systems Incorporated of San Jose, Calif., and the document 845 can be a PDF document.

Figure 9:
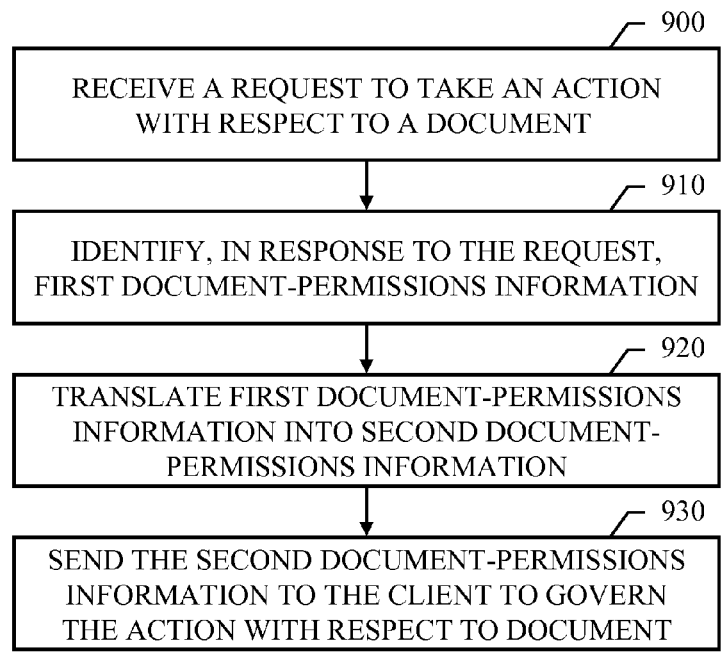
FIG. 9 is a flow chart illustrating a document control technique employed by a permissions-broker server.

FIG. 9 is a flow chart illustrating a document control technique employed by a permissions-broker server. A request from a client to take an action with respect to an electronic document is received at 900. In response to the request, first document-permissions information associated with the electronic document is identified at 910. The first document-permissions information can be in a first permissions-definition format. The identified first document-permissions information is translated into second document-permissions information in a second permissions-definition format at 920. The second document-permissions information is sent to the client to govern the action with respect to the electronic document at the client at 930.

Referring again to FIG. 8, the first document-permissions information 850 can be in a first permissions-definition format that includes at least one type of permission information that cannot be fully defined in the second permissions-definition format used in the second document-permissions information 855, and translating between the two sets of information 850, 855 can involve translating based upon additional information associated with the request 815. For example, the first information 850 can include time-dependent permission information that cannot be fully defined in the second information 855 because the permissions-definition format includes no notion of time. But this time-dependent permission information can be defined in the second document-permissions information 855 for the limited purposes of the current request by taking the time of the request into consideration. If the first document-permissions information 850, in conjunction with the time of the request 815, indicates that the requested action is authorized, then this can be represented in the second document-permissions information 855; and likewise, if the first document-permissions information 850, in conjunction with the time of the request 815, indicates that the requested action is not authorized, then this can be represented in the second document-permissions information 855. When a subsequent action is requested, the translation can be performed again based on the time of the subsequent request.

As another example, the first information 850 can include user-dependent permissions information that cannot be fully defined in the second document-permissions information 855 because the permissions-definition format includes no notion of users. This user-dependent permissions information can include both user and group-based document control information and can be defined in the second document-permissions information 855 for the limited purposes of the current request by taking into consideration user-identification information obtained from or through the client 810. This user-identification information can be obtained using the authentication systems and techniques described elsewhere herein. When a subsequent action is requested, the translation can be performed again based on newly obtained user-identification information.

Moreover, the multiple requests received by the permissions-broker server 820 can cause the server 820 to store information 825 relating to the actions taken at the client 810 with respect to the document 845. These actions can be associated with the username, and also with a network address (e.g., an Internet Protocol (IP) address) associated with the client (both as reported by the client and as reported by the server). Requested actions can also be considered actions taken, and the stored information 825 can be used by the server 820 to generate an audit of stored actions-taken information associated with the document 845, as described further below. Obtaining the actions-taken information can involve the consent-based auditing techniques described above. The stored information 825 can also include actions performed and/or requested at either the server 820 or the document source 830 (e.g., actions performed at the file system, document management system, etc.), and a generated audit can include this information as well.

Figure 10:
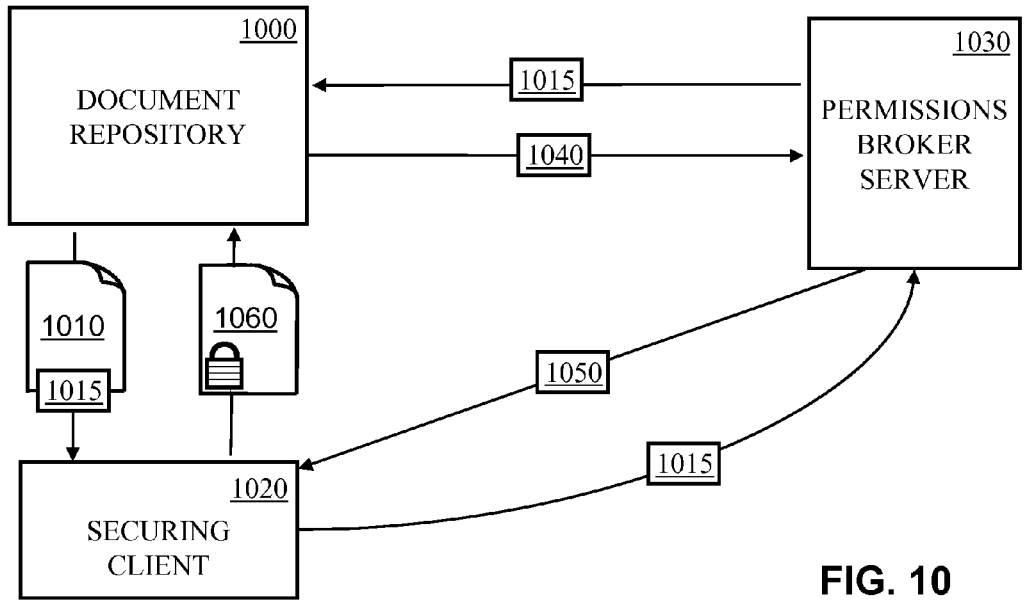
FIG. 10 is a block diagram illustrating workflow in a document control system integrated with a document repository.

FIG. 10 is a block diagram illustrating workflow in a document control system integrated with a document repository 1000. A permissions-broker server 1030 can be used to secure documents in the repository 1000 in a batch mode (e.g., when the server 1030 is first installed) and/or as a step in a content management system (CMS) workflow. A securing client 1020 can retrieve a document 1010 from the repository 1000. A document identifier 1015 can also be retrieved and passed to the server 1030. The document identifier 1015 can be used internally by the sever 1030 to control actions with respect to the content. If the repository 1000 is a CMS, the document identifier 1015 can be the document identifier used in the CMS 1000, and if the repository 1000 is a file system, the document identifier 1015 can be the URL (Universal Resource Locator) of the document.

The server 1030 can communicate with the repository 1000 using the document identifier 1015 to obtain document-permissions information 1040 (e.g., an ACL from a CMS or file permissions information from a file system). The document-permissions information 1040 can be specific to the document 1010 or can define permissions for multiple documents (e.g., a policy maintained by a document management system, or a set of file permissions maintained by a file system). The obtained document-permissions information 1040 can be used by the server 1030 to generate an initial ACL for the document 1010. A set of data 1050 that can include the initial ACL, the document identifier 1015, and a key generated by the server 1030, can be sent back to the securing client 1020. The client 1020 can use the set of data 1050 to create a secured document 1060, which is an encrypted version of the document 1010. This secured document 1060 can include the initial ACL, the document identifier 1015, and the key packaged as part of the document 1060.

When a client attempts an action with respect to the secured document 1060 (e.g., attempts to open the document 1060 or any copies of this document), the document identifier 1015 can be retrieved from the document, sent to the server 1030 and used to obtain the current ACL for the document 1060, where the current ACL reflects the current state of the document in the repository 1000. Thus, actions taken with respect to the secured document can be controlled based on document-permissions information defining current permissions for a source document in the document repository 1000. The source document can be the originally secured document 1060, or in the case where secured documents are not sent back to the repository 1000, the source document can be the original document 1010. The server 1030 need not store document-permissions information, as this information can be retrieved from the repository 1000 and translated whenever access to the document 1060 is requested, although the server 1030 may store the document-permissions information for other purposes.

Figure 11:
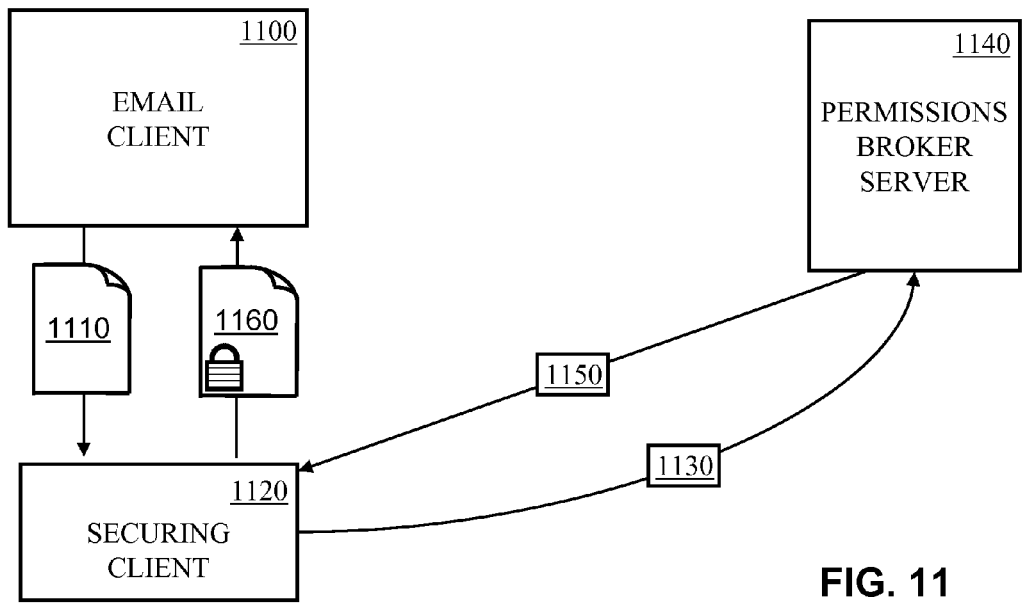
FIG. 11 is a block diagram illustrating workflow in a document control system integrated with an email client.

FIG. 11 is a block diagram illustrating workflow in a document control system integrated with an email client 1100. The email client 1100 can be a plug-in to an email system and can be used to secure an attachment 1110 to an email. When a user chooses to secure an email attachment 1110, the email client 1100 can prompt the user for the rules they wish to apply to the attachment and/or the rules can be generated automatically based on a recipient(s) list for the email. The rules can be converted into an ACL 1130 at a securing client 1120 and sent to a permissions-broker server 1140. The server 1140 can store the ACL and return a set of data 1150, e.g., as described above. This data 1150 can be used to create a secure attachment 1160 that includes a document identifier, which may be generated and stored at the server 1140, an initial ACL and an encryption key.

When a client attempts an action with respect to the secured document 1160 (e.g., attempts to open the document 1160 or any copies of this document), the document identifier can be retrieved from the document, sent to the server 1140 and used to obtain the current ACL for the document 1160, where the current ACL reflects the current state of the document ACL stored in the server 1140. The sender of the email can interact with the server 1140 to change the current ACL for the document 1160, even after the email has been sent. Thus, actions taken with respect to a secured document can be controlled, and nature of the security on the document can be modified, even after the secured document has been distributed.

FIGS. 8-11 illustrate access control infrastructure as can be implemented in a document control system. In the context of the server described in connection with FIG. 5, an access control service provider can be implemented, where access control can be defined in terms of access control lists (ACLs). ACLs can map permissions (e.g., can print, can view, etc.) to principals (e.g., users and groups), and vice versa. The access control service provider interface can define the methods used by the server to map these principals into a canonical form that can be consistently used across workflows. Access control service providers can be implemented for various systems, such as NIS (Network Information Service), an LDAP system, and an email system (e.g., Majordomo, which is a public software program primarily running on UNIX machines to handle Internet mailing lists). Moreover, the access control infrastructure can support shared ACLs (e.g., one ACL to be shared amongst multiple documents; such shared ACLs can be referred to as policies).

Figure 12:
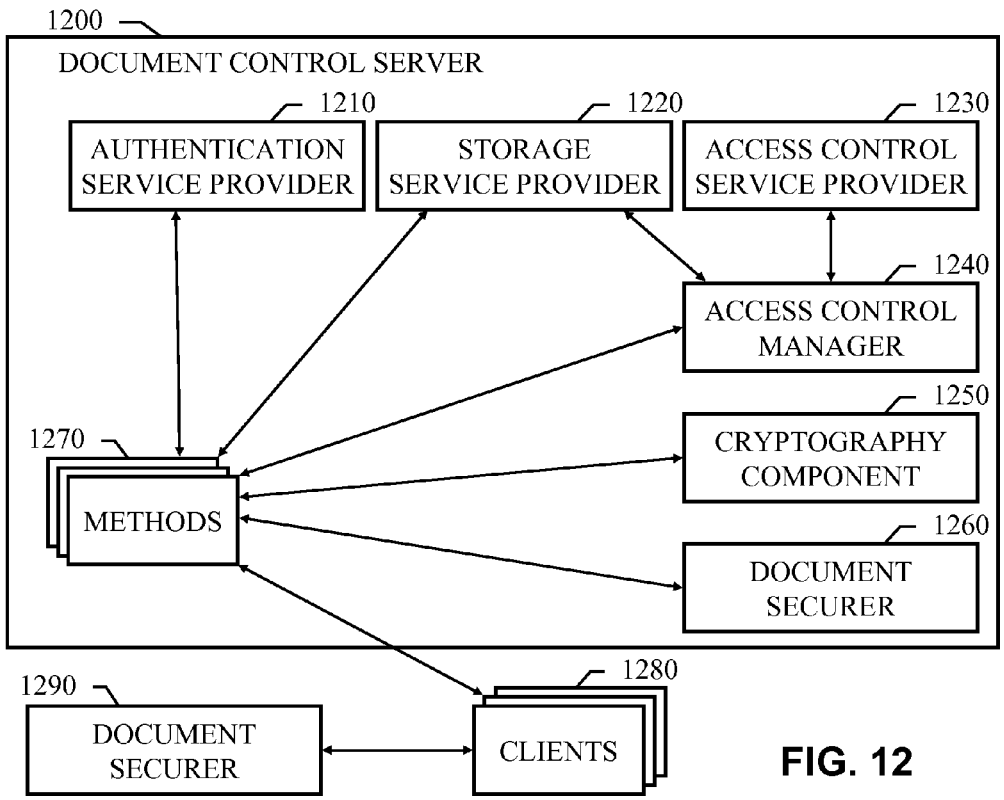
FIG. 12 is a block diagram illustrating a document control server corresponding to the example of FIG. 5.

FIG. 12 is a block diagram illustrating a document control server 1200 corresponding to the example of FIG. 5. The server 1200 can support a variety of basic features, including: (1) Access Control—the ability to control who can access a document and what permissions they have; (2) Revocation—the ability to revoke a document so that it can no longer be viewed; (3) Expiration and/or validity intervals—the ability to specify time before which and after which the document cannot be viewed; (4) Document Shredding—the ability to make a document unrecoverable with respect to the document control server upon the document's expiration by destroying the document decryption key; (5) Auditing—the ability to audit actions taken with respect to a document (e.g., viewing, attempted viewing, printing, etc), including consent-based auditing; and (6) Offline Access—the ability to access a document when offline. In addition, features can be easily added without changing the architecture.

An authentication service provider 1210 can be implemented as described elsewhere herein, and an access control service provider 1230 can effect the access control infrastructure described. ACLs can include a set of Access Control Entries (ACEs) and a set of properties. ACL properties can apply to the ACL as a whole (e.g., expiration date). An ACE can map principals to rules and can include a list of principals, a rule, and a validity period for the ACE. When an ACL is evaluated, only ACEs that are within their validity period need be considered. Validity periods can allow different users and groups to be granted permission to view a document at different times. For example, an ACE can specify that "only members of the public relations staff may view a document before its release date, after which anyone can view the document."

Rules can include of a set of properties and granted and denied permissions. These permissions can be specific to a viewing client application (e.g., the ADOBE ACROBAT® software) and/or server defined. Additionally, permissions, like properties can be extensible, so new ones can be added without changing the ACL format.

The server 1200 can have its own simple mechanism that allows users to specify Access Control Lists using a Securing Client interface without the use of any external ACL mechanism. Additionally, third party ACL/rights specifications can be translated to the internal ACL format used by the server 1200. The server 1200 can integrate with other systems' access control facilities (e.g., Document Management Systems, Database Systems, File Systems, etc), leveraging the functionality in these systems.

The server 1200 can support integrating with diverse user and group repositories that may contain incomplete information, and the server 1200 can be enabled to efficiently access this information in a canonical user-centric manner. Facilities for manipulating ACLs on both the server 1200 and a client 1280 can be provided. The server 1200 can verify ACLs to ensure they are valid before a document is secured, either using a server-based document securer 1260 or a client-based document securer 1290. ACLs can be extensible and can allow opaque third party permissions. Moreover, securing of documents can be done in an online-fashion, connected to the server 1200, because the server can verify ACLs.

The server 1200 can associate ACLs with documents in order to specify which principals (e.g., users and groups) have which permissions for a document. A principal can have multiple names; however, a principal should also have a distinguished canonical name. One of the tasks of the server 1200 can be translating the various names of a principal into its canonical name. While both permissions and properties can describe authorized operations, permissions can be Boolean valued and properties can be of a variety of types. Permissions can be granted if explicitly granted and not explicitly denied; undeclared permissions can be implicitly denied.

Each document can be associated with a single ACL. Typically this relationship can be 1:1, but in the case of policies this relationship can be N:1, where multiple documents share the same ACL. The electronic document file can contain an immutable snapshot of the ACL dating to the time of securing. The server 1200 can also maintain a copy of the latest ACL, which can be modified by authorized individuals. The server 1200 can canonicalize ACLs (e.g., translate all principal names to their canonical forms) before they are used. This can be done whenever ACLs are created or modified (e.g., at the time of securing, or when ACL definitions are changed). Once ACLs are in canonical form, it can be much simpler to evaluate ACLs on both the clients 1280 and the server 1200 since determining membership within groups as well as determining relevant authorizations for specific authenticated users can be done by basic string matching.

The server-side evaluation of ACLs for a specific user at a specific point in time (e.g., for online viewing, revocation, document audit retrieval, etc.) can be implemented within the server 1200 directly. The server 1200 can examine the ACL, looking for ACEs that are currently valid and that also contain either the authenticated user or a group in which s/he is a member, and then extract the permissions and properties. The server infrastructure to handle canonicalization within the server 1200 can have three tiers. A first tier can be an in-memory cache in the server 1200 that maps non-canonical principals into their canonical forms. A secondary persistent cache can store canonical mappings and user-in-group information; this cache can potentially be used across multiple servers 1200. The third tier can be the access control service provider 1230.

The access control service provider 1230 can include a set of principal modules that provide the canonical form of some set of non-canonical strings. These principal modules can also specify whether the canonical form corresponds to a canonical group or a canonical user. However, the architecture need not assume that a specific principal module will generally know all answers, or be able to give a complete answer about a specific non-canonical string. To support multiple domains of expertise within the context of user and group repositories, each principal module can publish the domain(s) over which it is the authority. The process of canonicalization, which can be implemented within the server 1200 directly, can take a non-canonical form and iteratively refine it by querying modules with authority until one declares the returned value as canonical.

Methods 1270 in the server 1200 can be authenticated-user-centric, because a typical scenario involves the server 1200 determining whether a specific user has permission to perform an operation, taking into account what groups s/he might be in. Many third party group mechanisms organize group membership accessible by "who are members of a group?", but not "which groups contain a specific user?" Moreover, in many cases groups may contain non-canonical forms of users. Thus, the output of group repositories may not be directly usable by the server 1200, and a translation intermediary can be employed.

A very low common denominator can be assumed for group providers. A group provider can be expected to be able to provide a list of known canonical groups. Thus, valid groups can be those in the union of known groups specified by group modules. Group modules can also provide membership information organized in a group-centric manner, which can be an efficient approach given the implementation of many existing repositories.

The server 1200 can have the capability to batch preprocess group information for subsequent use within the system. For example, one server in a group of servers can run such a batch operation on a daily basis. This can be implemented in the server core and can involve enumerating all groups, canonicalizing members, examining group nesting and computing the transitive closure. Most of the transitive closure computation can be within a storage provider 1220, since it is natural to perform these types of operations using database systems.

A principal can be either a user or a group. Principals can be represented as strings. Groups can contain principals. Principals can have many alias expressions that can be evaluated and reduced to a primary canonical form. Users and groups can be of multiple domains. A convention involving the name@sub.domain.com format used in email addresses can be adopted, even if the document control system integration is not email-based. Moreover, the specification of what the canonical form should be can be left undefined in the general system, as this specification can be integration-dependent. Examples in a particular integration context can be as follows: "herbach@company.com" is the canonical form for many strings, including "jonathan_herbach@corp.company.com" and "jherbach@company.com"; likewise, "atg@company.com" is the canonical form for "atg@sea.company.com".

An access control service provider interface can include principal providers, which can be divided into two subtypes: user modules and group modules. The goal of these modules can be to provide canonical information and group membership information. A principal provider can translate a principal, to the best of its ability, into canonical form. The principal provider can indicate whether the returned value is in canonical form, whether it is known to be a group or a user, and how long the returned result can be considered valid in a cache. A principal provider can have a domain of authority, specified as a set of regular expression definitions, and a group provider can enumerate all the groups it knows about in its domain of authority.

To support the various server methods 1270, user and group information can be provided logically, as there might be multiple sources of such information. Thus, there can be several User Modules and several Group Modules. From a high level, each one can be configured differently, can interface with different backend systems, and can be an authority over possibly multiple domains. Moreover, defining different modules as domain authorities can assist in providing extranet support.

Configuration of the principal modules can describe the appropriate class file. Each module can also have some module-dependent configuration information, e.g., connect strings and preferences, as well as infrastructure to configure what the authorities are. Different implementations can also have a rule governing pre-processing and post-processing to facilitate integration with the rest of the system.

Figure 13:
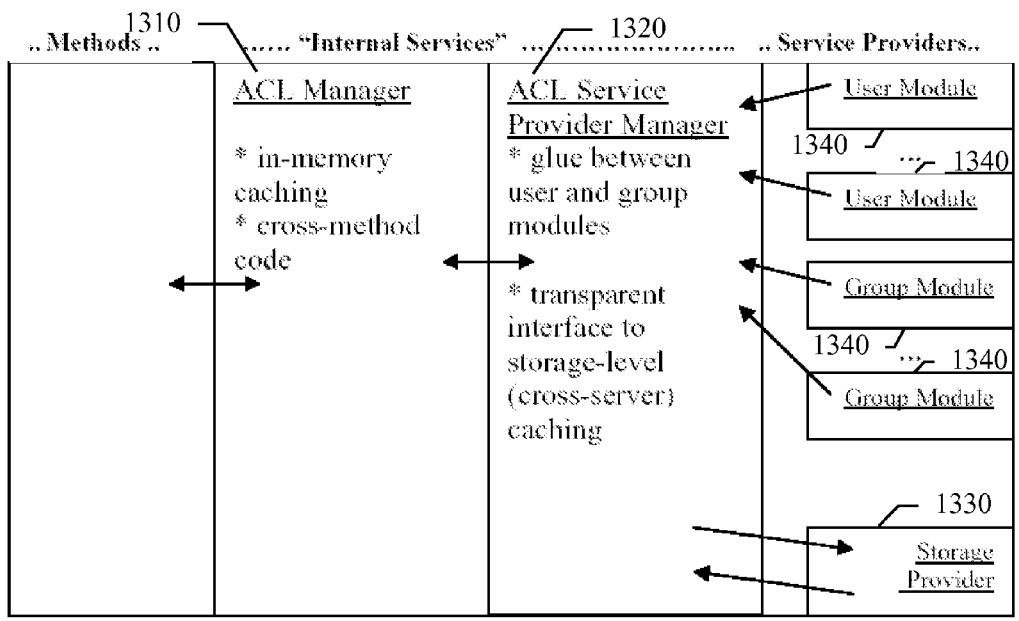
FIG. 13 is a block diagram illustrating example details of the server from FIG. 12.

An ACL manager 1240 can contain code relevant to loading an arbitrary number of principal providers. FIG. 13 is a block diagram illustrating example details of the server from FIG. 12. The server can have a primary in-memory cache, handled by an ACL manager 1310, for group membership or canonical mappings. The user can store within memory the recent canonical mappings such that the service providers need not be called for common requests.

The ACL manager 1310 can also include cross-method code, and an ACL Service Provider Manager 1320 can be a transparent interface to storage-level (e.g., cross-server) caching. Queries to the ACL Service Provider Manager 1320 can first result in checking whether a storage provider 1330 has the necessary information, and return that. If not, the ACL Service Provider Manager 1320 can issue queries to user and group modules 1340 and attempt to persist as much information to the storage layer as possible. Cache entries can be cleaned as per an expiration associated with the canonical result returned (e.g., as specified by either the storage provider or the principal modules).

Referring again to FIG. 12, a storage service provider 1220 can provide an interface that describes a collection of methods that the server 1200 uses to create and retrieve data in persistent storage. This interface can be the largest service provider interface in the system and can grow further as new integrations and features are implemented in a document control system. The storage service provider 1220 can provide methods in the following areas:
(1) Allocation of document tickets—each document that is secured on the server can be given a ticket including a GUID (global unique identifier); (2) Recording document revocation; (3) Saving encryption keys for users, groups, documents, and the root server keys; (4) Caching user alias and group membership data; (5) Auditing user access and securing; (6) Management and storage of named ACLs or policies; (7) Storage and retrieval of the current ACLs for documents; (8) Creation of initial ACLs for documents.

The storage provider interface can be designed to allow multiple implementations across a wide variety of backend systems. This can be done using a generic relational database implementation, which can work with both ODBC (Open Database Connectivity) and JDBC (Java Database Connectivity). In addition, the storage provider interface can be designed to support an implementation for a content management system, such as the Documentum® system. Ticket generation can be straightforward. For example, this can be implemented by having an integer in the database that is incremented on each reservation. Document revocation can be defined as the ability to revoke a document based upon its ticket and to separately query whether the document associated with a given ticket has been revoked. The storage provider can also store and retrieve keys, which can be arbitrary byte arrays, by name.

The storage provider can also provide storage for user alias and group membership data. Alias and membership information can be used to evaluate access control lists; the storage provider 1220 can be used as a cache to help ensure reasonable performance even if the access control service provider 1230 is not capable of providing efficient access to this information. For example, in the limiting case, the access control information might come from flat files that provide the required data. When caching user and group alias information, the storage provider can perform retrieval queries based upon a principal, much like user and group providers can enumerate users/groups based upon a domain of authority of a principal provider. The data returned should be of the same format, also providing an indication of the validity. The goal can be such that when the server uses user alias or group membership data, the server should not distinguish whether the data provided is real-time or a cached version.

For a given user or group, the canonical name of the user or group can be obtained. For a user, all of the groups to which this user belongs can be obtained. Changes to alias data can be immediately visible. Changes to the group membership cache may be more complicated, because of transitive closures computation (group memberships of groups that contain groups). Because of this, group content changes may not be immediately visible if the server is currently computing the transitive closure of groups.

Document securing operations and document access attempts (whether successful or not) can be audited through auditing methods of the storage provider 1220. This can also include functionality to take different types of audit information (e.g., third party audit trail objects) and insert such into a package of document audited actions. In addition to defining the methods to record securing and access events, the interface can also define a couple of query methods on the audit history—querying by document ticket and by user. The storage provider can also implement methods that allow ACL creation and modification. These methods can be used to keep auditing history information. Multiple implementations of the storage service provider 1220 can be implemented as needed, including using a relational database and/or using existing document management system notions of audit logs (e.g., Documentum® audit trail objects).

The storage provider 1220 can store and retrieve ACLs by name. An ACL can be a private ACL (e.g., for a particular user) or a public ACL. Public ACLs represent policies that are intended to be shared across multiple documents secured by various users. The stored representation of an ACL can be a matter of concern only to the storage provider, as the provider implementation can be designed to simply take ACLs as arguments and return ACLs as results; the ACLs can be described in terms of an AccessControlList interface.

The storage provider can have a set of methods to create, update, delete, and retrieve ACLs. The methods can take arguments describing either a named ACL or a policy (e.g., a public ACL). There can also be methods to associate a stored ACL with a given document (using the ticket GUID). When associating a given document with an ACL, ticket data can also be stored. This ticket data can be specific to a particular document and can be used to store document-specific information like the date when the document was secured as well as which principal secured the document. An ACL shared amongst documents can also specify controls relative to the time of securing or to the person who secured the document. The ticket data can also be used by the securing client to provide information corresponding to the service provider. For example, in a Documentum® system integration the ticket data can provide the Documentum® GUID for the source document. The service provider information can also be a byte sequence received from the service provider including a set of name/value pairs that capture appropriate informational aspects of the document corresponding to the service provider.

In addition to the ability to retrieve ACLs by their name, the server can also retrieve an ACL for a specific document. When retrieving an ACL for use, the server can optionally provide a principal as a parameter. This provides a hint, allowing an optimized storage provider to return the subset of an ACL that is relevant for that particular principal.

When creating and storing an ACL, there is also the opportunity to pass through service-provider specific data that was presented to the securing client. This can provide an end-to-end mechanism to give a hint to the service provider on what specific ACL this document refers to. This is analogous to the capability described above in connection with the ticket data, but may be specific to an ACL as opposed to a document.

The storage providers need not interpret ACLs. The storage provider can simply store and retrieve ACLs without doing any interpretation of them. When a document is created it can be given an initial ACL, which can be stored in the document and used for offline access control if no other ACL for the document exists locally at the client. The storage interface can provide the methods by which these current and initial ACLs are passed back to the securing or viewing components of the server. In general, there can be two main cases: (1) the content being secured does not have any separate identity outside of the document control system (e.g., the content is an email attachment); (2) the content does have an identity outside of the document control system (e.g., the content is a PDF rendition of a document inside a Documentum® repository). In this latter case, the service provider should be able to dynamically control access to the content in terms of the current rules the repository applies to the object from which the content was derived. Moreover, once an ACL has been saved, it can be modified by the owner, or by a system administrator in the case of a policy.

Both the initial and the current ACL can be generated by the storage service provider, and access control for the content can be mediated in terms of the access control on the underlying object. Otherwise, the management of the content may be precisely the same, in both the online and offline case. In addition, a Boolean supportsProvider method can be provided that the client can use to see what service(s) are supported by the service provider. The client can thus have an expectation of which service provider it can use, and can determine from the supportsProvider method if this service is actually supported by this document control server configuration (e.g., this determines what set of name/value pairs can be legally included in the service provider information in the ticket data). If supportsProvider( ) is true for some service, then the remainder of the interface should be implemented. Thus, a customer could use the same server both to protect content in a document repository and to protect email attachments.

The server 1200 can also include a cryptography component 1250, which can have duplicate implementations that take advantage of various native cryptography components (e.g., Java Cryptography Extension or .Net Crypto components). In general, a document control server uses several cryptographic primitives. These cryptographic primitives' implementations can be placed behind general interfaces, allowing the implementations to be changed (e.g., change key sizes, etc.) as needed, e.g., to add security features and/or to address the needs of specific enterprises. Additionally, these cryptographic primitives' implementations can use standard cryptographic operations as well as custom operations.

The interface of the cryptography component 1250 can provide support for the following primitives: (1) symmetric encryption and decryption (e.g., 128-bit AES (Advanced Encryption Standard) and/or 128-bit RC4 (Rivest Cipher 4)); (2) public key encryption and decryption plus signing and verification (e.g., 1024-bit RSA); (3) message authentication code (MAC) used to provide document integrity (e.g., the one-way HMACSHA1 hash function with a 128-bit key); (4) a secure hash function for which it is computationally infeasible to find two messages that hash to the same value (e.g., SHA1); and (5) random number generation used to create cryptographic keys and introduce randomness into messages (e.g., the Secure Random number generator provided with the .Net framework for a .Net implementation and the java.SecureRandom class for generating random numbers in a Java implementation). These cryptography primitives can be implemented in Java using the Java Cryptography Extension (JCE) mechanism and in one of the .NET languages using the .Net Service Provider mechanism. This cryptography interface and the cryptography implementations should also be used on the clients, as both the clients and the servers in the document control system can secure and access documents using these cryptography techniques. The cryptography interface can also be implemented in C++ for any cryptographic operations used on clients written in C++.

Figure 14:
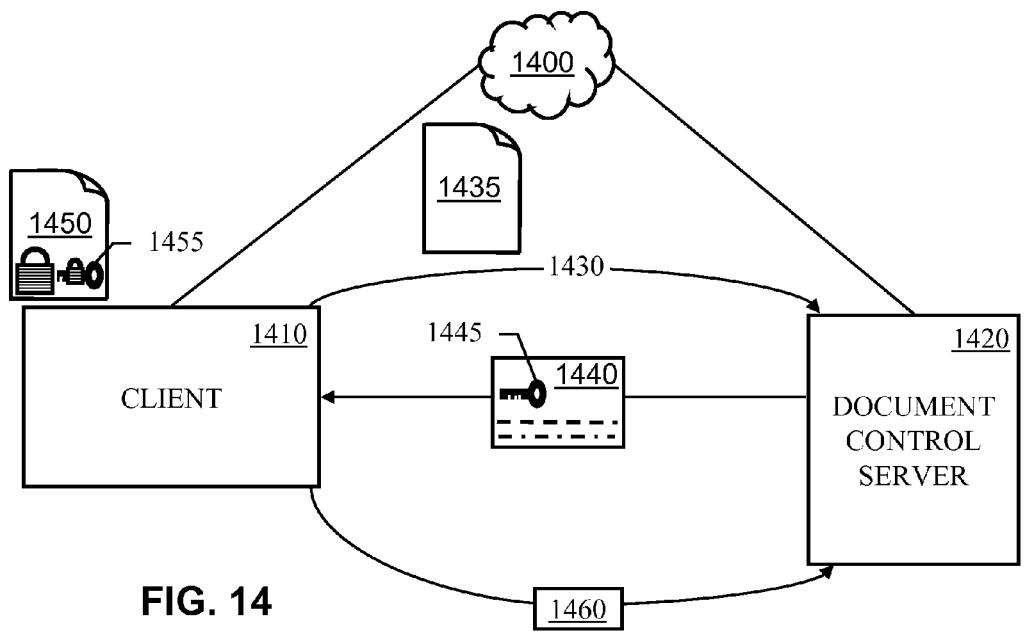
FIG. 14 is a block diagram illustrating an offline document access model as can be used in a document control system.

FIG. 14 is a block diagram illustrating an offline document access model as can be used in a document control system. A client 1410 can be communicatively coupled with a document control server 1420 over a network 1400. The document control server 1420 can provide multiple offline usage models, including a lease model similar to traditional offline access models, where the user must be online the first time a document is accessed and can subsequently access the document offline for a specified period of time, i.e., the lease period. In addition, the document control server 1420 can provide an initial access model, where the user can be offline when the document is accessed for the first time. In this application, the term "online" means the client 1410 can communicate with the server 1420; thus, the client 1410 is connected with the network 1400, and the server 1420 is operational, when the client 1410 is online.

In general, the client 1410 and the document control server 1420 periodically synchronize to update any changes to offline access information retained at the client 1410, where this offline access information can effectively pre-authorize the client to allow actions with respect to secured documents that have yet to be accessed while the client 1410 is connected to the network 1400 (e.g., a secured document received by email at the client but not yet opened). The client 1410 can send a request 1430 to the document control server 1420. The request 1430 can be for an update to its offline access information. For example, an agent can be provided with the client 1410 that periodically connects to the server 1420 and downloads offline access information; this synchronization operation can happen silently in the background without a user of the client 1410 being aware of the updates; the next time the user attempts to open a document, the downloaded offline access information can be used by the client for future access while offline.

The request 1430 can be any type of request sent to the server 1420 periodically, such as a request from the client 1410 to take an action with respect to a document 1435, which may be located at the client 1410 or elsewhere and may be a secured document or not. The server 1420 can verify an authenticated user at the client 1410 in connection with the request 1430, and this verification of an authorized user can cause the synchronization operation to initiate. For example, the server 1420 can be a server such as any described above, and the synchronization operation can piggyback on other operations that use authentication (e.g., when a user attempts to access or secure a document while online). Alternatively, synchronization can occur without prior authentication; the server 1420 can encrypt the offline access information using the user's public key so that only the user can decrypt them; the encrypted offline access information can be retained by the client 1410, and when the user next attempts to open a document, the retained information can be decrypted and used to update the client's secure local database as described further below.

When the client 1410 synchronizes with the server 1420, the server 1420 can send offline access information 1440, which includes a key 1445 associated with a group of users to which the current user belongs (a picture of a key is used symbolically in the figures to represent one or more encryption keys). The key 1445 can be used to access a secured electronic document 1450 while offline by decrypting a second key 1455 in the electronic document 1450. The electronic document 1450 can include content encrypted with the key 1455, and the electronic document 1450 can include the key 1455 encrypted with the key 1445. Alternatively, there can be one or more levels of indirection in this key encryption relationship. For example, the key 1445 can be used to decrypt the key 1455, which can be used to decrypt another key that is then used to decrypt the content of the document 1450. Regardless of the number of levels of indirection and the number of keys employed, the key 1445, which is associated with a group of users, can be used to access the secured electronic document 1450 while offline by decrypting a second key 1455 in the electronic document 1450. Additionally, the offline access information 1440 can include other group-specific keys, one or more user-specific keys, at least one set of document-permissions information associated with multiple documents (e.g., a policy as described above), and a document revocation list.

The synchronization operation can also involve the client 1410 sending back to the server 1420 an offline audit log 1460 of operations performed by the client while offline; the offline audit log 1460 can include consent-level audits as described above. Thus, the client can periodically synchronize with the server to upload audit log messages that have been retained locally and to download the latest revocation list and any updates to policies. In a system employing ACLs as described above, all new ACLs need not be downloaded with each synchronization because of the potentially large number of ACLs in the system. The document control system can provide a constrained set of guarantees as to the freshness of data. The guarantees used can be as follows: (1) Each document-specific ACL and policy specifies a period of offline validity (e.g., a number hours or days for which the document-specific ACL is valid before another synchronization with the server is needed, and after which, the document may not be viewed offline without synchronization). (2) At each synchronization, all revocations and policy updates are synchronized with the client. Thus, a policy or revocation list can be at most a specified number of time units out of date with respect to a particular document. Moreover, the synchronization can also send a current ACL for any document being accessed while online.

Figure 15:
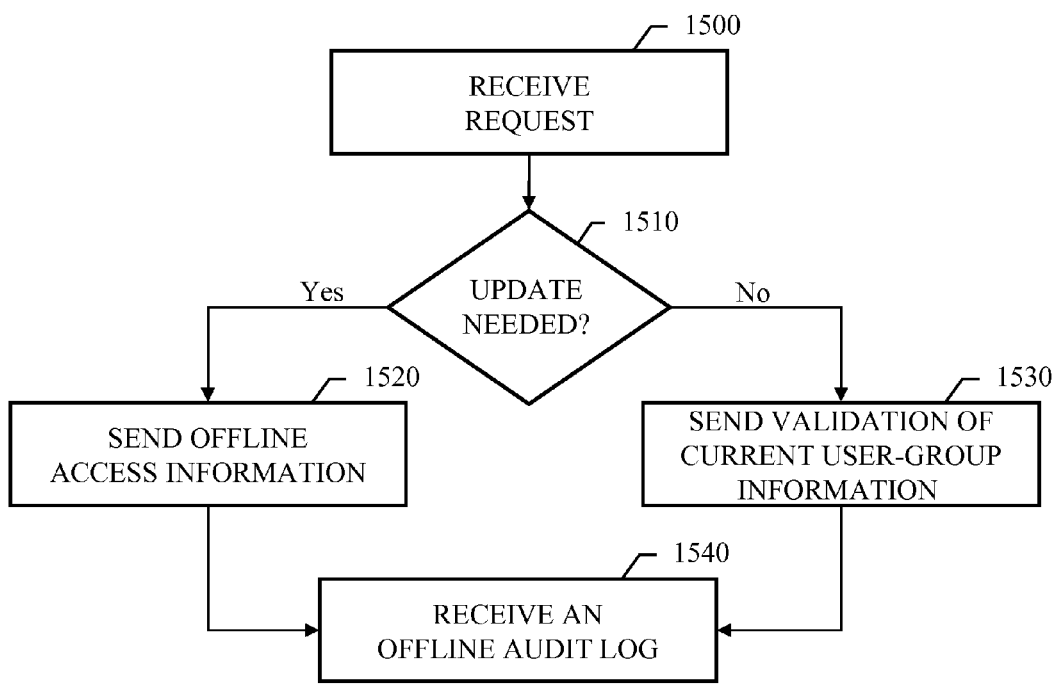
FIG. 15 is a flow chart illustrating a synchronization operation as performed by a server.

FIG. 15 is a flow chart illustrating a synchronization operation as performed by a server. A request is received at 1500. In response to the request, the server determines if an update is needed at 1510. For example, the server can compare a time of last recorded client-synchronization with a time of last change in user-group information for the user, or the server can compare current user-group information for the user with received user-group information for the user from the client (e.g., the client can identify to the server its currently retained user and group keys, and the server can respond based on whether any changes to the client's retained keys are needed).

If an update is needed, the server sends offline access information at 1520. This can involve the server sending the client a list of the keys to remove and the keys to add locally. If no update is needed, the server sends a validation of the current user-group information at 1530. This indicates to the client that current offline access information is valid, and the client and server are synchronized as of the current time. Additionally, when the server sends the offline access information at 1520 or revalidates the client's offline access information at 1530, the server can also send a server-reference time to be recorded at the client and used in determining when a client-server synchronization is needed again in the future. Finally, the server receives an offline audit log from the client at 1540. Thus, the server can generate audits, as described above, that include information relating to actions taken with documents while offline.

Figure 16:
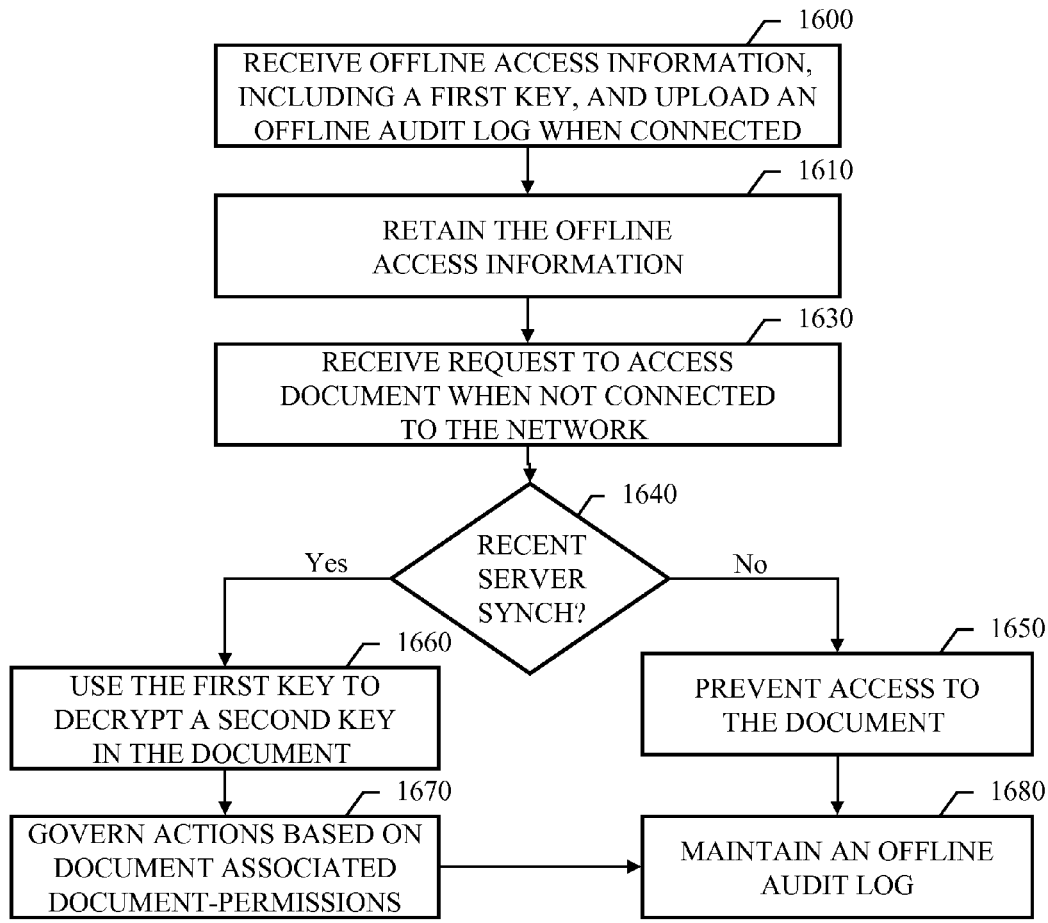
FIG. 16 is a flow chart illustrating a synchronization operation as performed by a client.

FIG. 16 is a flow chart illustrating a synchronization operation as performed by a client. Offline access information, including a first key, is received, and an offline audit log is uploaded to a server when the client is connected to the network at 1600. The client retains the offline access information at 1610. Cryptographic keys and other sensitive information can be retained locally on the user's machine in a secure manner, such that an attacker can not gain easy access to such information.

Security may be provided by encrypting the files with a cryptographic key stored in tamper-resistant hardware, e.g., a smartcard or an embedded security chip. If hardware tamper-resistant storage is not available, software obfuscation techniques may be used to provide some security. The data retained at the client can include user and group private keys, a document revocation list, updated ACLs for policies, updated ACLs and security data for documents the client has accessed while online, and an offline audit log of operations performed by the client while offline.

A request to access a document is received when the client is not connected to the network at 1630. A check is made to determine if a recent server synchronization has occurred at decision 1640. For example, the client can check whether a difference between a current time and a receipt time of the offline access information exceeds a server-synchronization-frequency parameter. The server-synchronization-frequency parameter can be specific to the document to be accessed.

Moreover, determining the current time can involve comparisons between the last known synchronization time and the local system clock.

If a synchronization with the server has not occurred recently enough, the client prevents access to the document at 1650. If a synchronization has occurred recently enough, the first key is used to decrypt a second key in the document at 1660. Actions with respect to the electronic document can be governed based on document-permissions information associated with the electronic document at 1670. Governing actions with respect to the electronic document can involve obtaining the document-permissions information from the electronic document itself. Governing actions with respect to the electronic document can involve identifying a document policy reference in the electronic document, and obtaining the document-permissions information retained locally, based on the document policy reference. Additionally, an offline audit log, which can record both document access and attempted document access, can be maintained at 1680.

Figure 17:
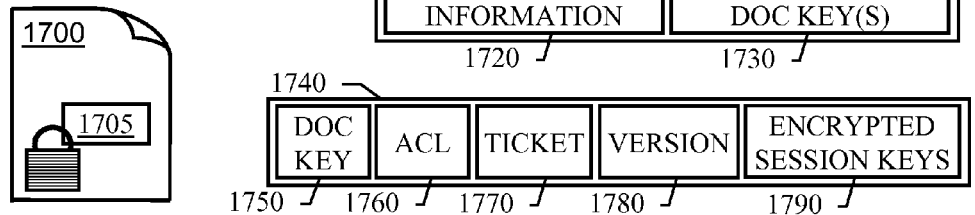
FIG. 17 is a block diagram illustrating components of a secured document.

FIG. 17 is a block diagram illustrating components of a secured document 1700. Included within the secured document 1700 can be an encrypt dictionary 1705. The encrypt dictionary 1705 can include encrypted keys, which can be used to access the content of the document 1700, and an address (e.g., host name, port number, and connection protocol) of the server to contact when online. The encrypt dictionary 1705 can be embedded within the encrypted document 1700 in a location that is not encrypted by the document key used to encrypt the document (i.e., used to encrypt the document content).

An example encrypt dictionary 1710 includes document permissions information 1720 (e.g., the initial ACL described above) and one or more encrypted document keys 1730. The document key used to encrypt the content of the document 1700 can be encrypted multiple times using group keys and user keys, and these encrypted document keys 1730 can be included in the encrypt dictionary 1705 in the secured document 1700. A document control server can dynamically generate and maintain user and group keys for the user and groups in a document control system. By including the encrypted document keys 1730 and the document-permissions information 1720 in the document 1700, offline access can be supported by providing the appropriate user and group keys to the client using the synchronization operation described above.

Another example encrypt dictionary 1740 includes a document key 1750, an ACL 1760, a document ticket 1770, version information 1780 (e.g., a format version string), and encrypted session keys 1790. The document key 1750 can be a random 128-bit key generated by the document control server and used to encrypt the document content (e.g., using RC4 or AES encryption). A portion of the encrypt dictionary 1740 can be encrypted using a generated session key, and a MAC can be used to detect any modification of the encrypt dictionary. The encrypted session keys 1790 can be the session key encrypted multiple times using the group keys and the user keys. Additionally, the session key can be encrypted with the server's public key.

When a user attempts to open a document offline, the client can check to see if the session key for the document has been encrypted with the user's key or the group key of any group of which the user is a member. The client can obtain the user's key and keys for all groups of which the user is a member during synchronization with the server. The appropriate key is then used to decrypt the information in the document's encrypt dictionary. The client can then evaluate the ACL in the same way ACLs are evaluated on the server to determine what permissions the user has. The client's revocation list can be checked, and if the document has not been revoked and has not expired, the document can be opened and the user's access to the document can be audited locally.

This initial access model allows a user to be offline the first time they access a document. When the document 1700 is secured, the initial ACL for the document can be embedded, immutable, in the document. When a user attempts to open the document, the embedded ACL can be used to determine whether they have access. The document 1700 can still be revoked or expire even though an initial ACL is kept within the document. Moreover, the current ACL for the document 1700 maintained elsewhere can be updated, and this ACL can be used when the client is online, as described above.

When a user accesses a document online, the current ACL, which can be stored on the server, can be retained on the client and used for that access. The retained ACL can then be used for future offline access to the document. When the client obtains the updated ACL from the server, the client can also obtain the document session key, separately encrypted with the key of each user and group that can access the document. Both the ACL and the encrypted keys can be secured in a manner similar to that initially embedded in the document.

Moreover, the document permissions information 1720, 1760 in the document can include a policy, i.e., a document policy reference or identifier. Thus, the client can identify a document policy reference in the electronic document while offline, and obtain the document-permissions information of the policy, retained locally, based on the document policy reference. As the document control system can guarantee that all policy updates are reflected on the client with each client-server synchronization, an administrator can change a policy and know that within a bounded amount of time, the change will be reflected on all clients that are still providing access to any documents.

In addition to the initial offline access model described above, a traditional lease model can also be used in the document control system to provide additional flexibility. In this model, the first time a user accesses a document from a particular machine, they must be online. At that time, they receive an offline lease, which allows them to view the document for a specified period of time offline before the lease must be renewed. Such a lease model can be implemented in the document control system described by embedding an initial ACL allowing access to no principals, and employing a validity_interval that specifies how long an ACL can be retained on the client before a new one needs to be fetched from the server. Additionally, the document control system can be configurable to enable a no-offline-access model in which the user must be online in order to access a document; in this case, the keys needed to open the document need not ever be retained on the client.

The document control system can provide all of the following security guarantees together as well, generally subject to the accuracy of client time. (1) Policy Modification—A policy modification is guaranteed to be reflected on each client within the offline validity interval specified in the policy since all policies are synchronized at every synchronization operation. (2) ACL Modification—A (non-policy) ACL that has been modified will be reflected on the client only if it is viewed while online. Retained non-policy ACLs are guaranteed to be dropped from the client within the validity period if specified in the ACL. (3) Revocation—A document that has been revoked is guaranteed to be unviewable by all clients in the system within the offline validity interval, specified in the document's ACL since revocation is synchronized with the client at every synchronization operation. (4)

Expiration—A document that has expired will be unviewable on the expiration date regardless of whether the user is online or offline. (5) Expiration modification—Expiration is specified in the ACL, and so expiration modifications are reflected as per-Policy or per-ACL modifications. (6) User or Group membership modification—If a user's key is revoked (e.g., because they leave the company) or if the user is removed from a group, it can be guaranteed that the user will not be able to view a document that they no longer have access to within the offline validity interval for the document.

Figure 18:
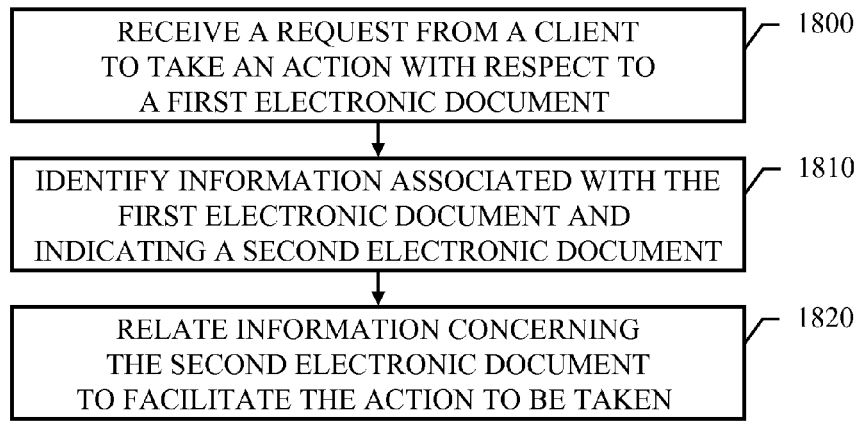
FIG. 18 is a flow chart illustrating a document information delivery technique employed by a server.

FIG. 18 is a flow chart illustrating a document information delivery technique employed by a server. A request for a client to take an action with respect to a first electronic document is received at a server at 1800. In response to the request, information associated with the first electronic document is identified at 1810. The associated information can indicate a second electronic document that is different from and associated with the first electronic document. This information can associate two or more documents and can describe the relationship(s) between them; this association information can be stored at the server, e.g., in a table or a database. Information concerning the second electronic document is communicated to the client at 1820 to facilitate the action to be taken.

Relating the second document information to the client can involve sending the second document information to the client to allow selection of one of the first and second documents with respect to the action. Relating the second document information to the client can involve obtaining the second electronic document, and sending the second electronic document to the client to allow taking of the action with respect to the second electronic document instead of with respect to the first electronic document. The second document can already exist or may need to be generated in whole or in part, which can be indicated by the associated information indicating the second document.

Figure 19:
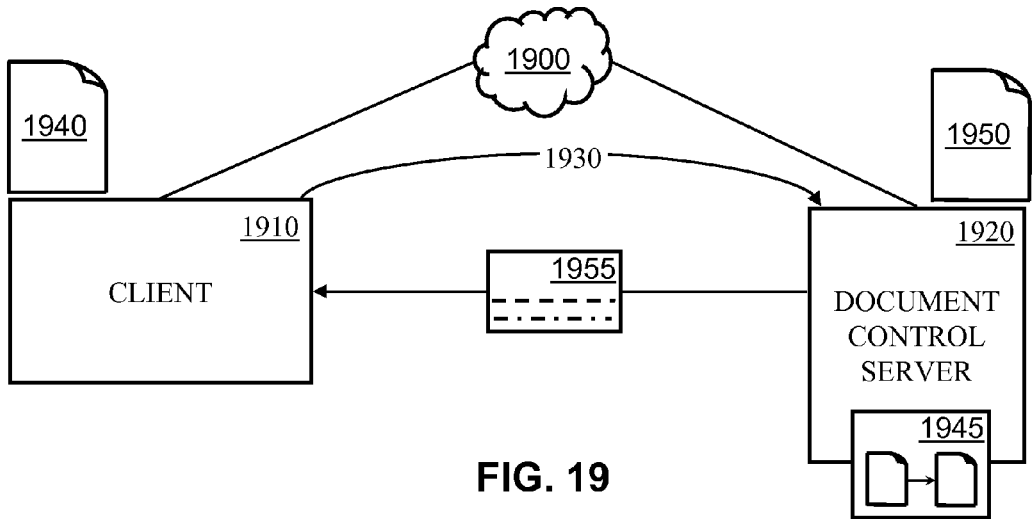
FIG. 19 is a block diagram illustrating workflow in a document control system.

FIG. 19 is a block diagram illustrating workflow in a document control system. A client 1910 can be communicatively coupled with a document control server 1920 over a network 1900. The client 1910 can send a request 1930 to the document control server 1920, where the request 1930 relates to an action to be taken with respect to a document 1940. The server 1920 can check information 1945, which can be stored locally or elsewhere, that is associated with the document 1940 and indicates a second document 1950. The server 1920 can then send information 1955, which can be information about the second document 1950 and/or the document 1950 itself.

The client 1910 can force a user to view the second document 1950 based on the information 1955. For example, the second document 1950 can be a later version of the first document 1940, and the information 1955 can include document-permissions information specifying that the action is not permitted with respect to the first document 1940. The first document 1940 can be replaced with the second document 1950 (e.g., opened in place of the first document and/or written to storage over the first document) by the client 1910, including potentially without the knowledge of the user. The second document 1950 can also be a different language version (e.g., a French version of an English original) or a different format version (e.g., a different file compression and/or encryption scheme) of the first document 1940.

Obtaining the second electronic document 1950 at the server 1920 can involve generating at least a portion of the second electronic document 1950 (including potentially generating the entire document 1950), or the document 1950 can be a pre-existing document. The associated information 1945 can include user-based association information, and obtaining the document 1950 can involve obtaining the document 1950 based on the user-based association information and an identified user at the client 1910. The document 1950 can be customized for a particular user, the user's location and/or the user's time of access (e.g., the document 1940 can be a stub document that is already identified as outdated when sent, and when this stub document is opened, each user can automatically receive a new document generated specifically for that user at the time of the access attempt, i.e., the stub document looks like and can be manipulated as a regular document in an operating system, but is always current when opened while online). Customization of the document 1950 can be done at the server 1920 or elsewhere. The user can be identified as described above, and the document control system can also employ the systems and techniques described throughout this patent application; the documents 1940, 1950 can be secured documents as described above.

Figure 20:
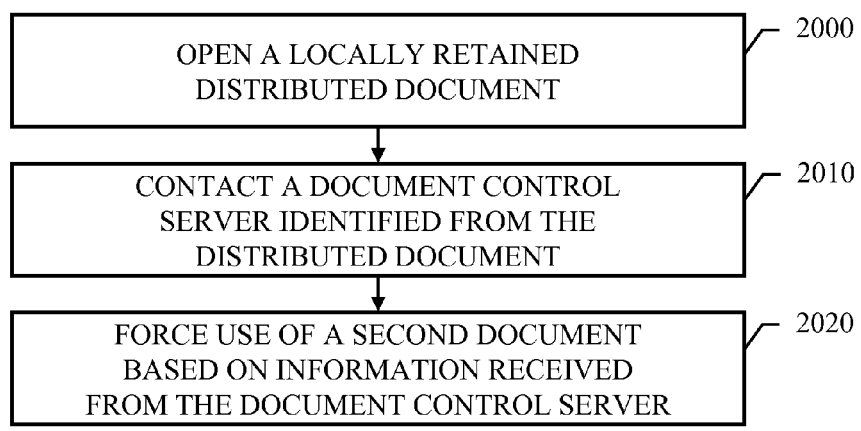
FIG. 20 is a flow chart illustrating a document information receiving technique employed by a client.

FIG. 20 is a flow chart illustrating a document information receiving technique employed by a client. A locally retained distributed document is opened at 2000. The distributed document can be a secured document, as described above, that identifies a document control server to contact. A document control server identified from the distributed document is contacted at 2010. The server can determine whether the distributed document is the appropriate document, or if a different related document should be used instead. Use of a second document in place of the distributed document is forced at 2020, with respect to a document action, based on information received from the document control server.

A document control system can thus address both issues of document security and version management in one system. If a different version of a distributed document should be viewed in place of the distributed version, this can be defined and controlled in a document control server that also handles document security for distributed documents. An author of a document can specify that a distributed version of a document is outdated, and a newer version should be viewed instead. Moreover, an author can easily control multiple versions of a document and user-based definitions of who should view which version.

An author or administrator can designate which documents are appropriate versions for which recipients, including the possibility that two users receive entirely different documents with different content and which are different document versions in the sense that they both relate to an originally distributed document. Version relationships among documents can be specified using the document identifiers generated for document security purposes. The version relationships can be defined using a directed graph in which each node is a version, and the directed edges indicate which versions take precedence. Each edge can also indicate to which users it applies. A graphical user interface for displaying diagrams can be used to define the version relationships, e.g., by drag and drop operations to specify which versions become outdated in favor of other versions.

In the context of different sequential versions of a document, where each document can be revised and the system can ensure that each user only views the latest version of a document, the notion of revocation in the document control system can be extended to include whether a document has been replaced with another. Thus, upon opening a document, in addition to checking whether users have access to perform traditional actions on the document (e.g., print, etc.), a determination can be made as to whether the user should have access to a specific version of the document. The server 1920 can store information about where documents can be found, including potentially providing an additional repository service where documents that are being persistently versioned can be stored.

In the case where each user can view a different version, a similar approach can be used, with the addition of the ability to specify intersecting user/groups (e.g., "instead of version zero, all employees should see version A; all managers should see version B; and an executive should see version C", where additional version relationship information specifies that the executive can open the subordinate versions A and B in addition to version C). Rules for resolving conflicts can be provided.

The systems and techniques described herein can be combined in a comprehensive document control system employing multiple document control servers. Referring again to FIG. 12, the document control server 1200 can implement the various techniques described, in combination. To increase system security, all client-server communications can be over Secure Socket Layer (SSL), which encrypts the communications and provides server authentication, and/or securing of documents can be done using client-side securing. The server 1200 can be physically secured from an attacker and can sit behind at least one firewall. All sensitive state information in the server 1200 can be encrypted before it is persisted to stable storage; the encryption key used for this can be embedded in the server code, hidden in obscure system resources and/or contained within a tamper-resistant cryptographic module. Moreover, on the client side, a user's logon credentials can be cached to avoid repeated authentications for multiple consecutive operations that require authentication. Cached credentials can be signed by a server private key, dedicated to this purpose, and reside on the client; the signed credential can include an expiration date to limit its validity period and can be presented when the client attempts to authenticate against the server 1200.

As mentioned above, documents can be secured either at the server or at the client. A document can be converted from one format to another (e.g., from Microsoft Word to PDF) before securing; the document control system can be integrated with a PDF creation service for this purpose. The securer component 1260, 1290 can be a wrapper around a PDF library that takes a PDF document as input as well as an encryption key and a set of name/value pairs that represent information to be embedded in the PDF document's encrypt dictionary. The securer can encrypt the document with the provided encryption key and embed the specified information in the document. When the securing is performed on the server 1200, the securing can be done in a separate process—a pool of such processes can be kept available so that multiple securing requests can be simultaneously satisfied, and the maximum number of such processes can be a configuration option for the server 1200. These securing processes can be terminated after some number of successful securing operations, which number can also be a configuration option, or after any unsuccessful securing operation.

Figure 21:
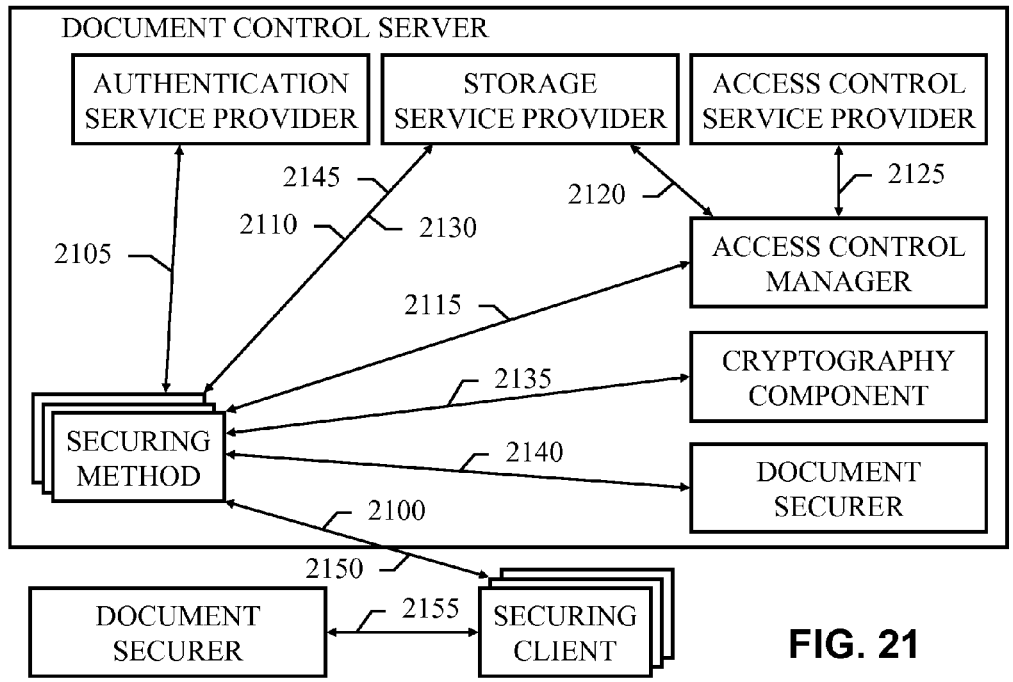
FIG. 21 is a block diagram illustrating document securing workflow in the document control server of FIG. 12.

FIG. 21 is a block diagram illustrating document securing workflow in the document control server of FIG. 12. Securing a document can generally involve two high-level operations: preparing system state associated with securing of a document, and embedding relevant information into the document and encrypting it. Preparing state can be a joint operation between the securing client, specifying how a document should be secured, and the server, which can prepare the system for the secure document. Embedding information into the document and securing can be done either on the server (e.g., the unencrypted document is sent up to the server at time of securing and then the encrypted form is returned to the client), or on the client (e.g., the client has the components necessary to encrypt the document).

The securing client can prepare a specification of the desired security for the document to be secured. This can involve end-user interaction in a client, such as an email application like Outlook® software, provided by Microsoft Corporation of Redmond, Wash. The client can connect to the server using the RPC interface, authenticate, and send information up to the server (2100). If the system is using server-side securing, the client can send the unencrypted document and the securing specification up to the server. If the system is using client-side securing, then only the specification need be sent.

The server can authenticate the user, ensuring that he has permission to secure a document (2105). The service provider can provide a ticket for the document (2110). The Access Control List specification can be given to the Access Control Manager so it can canonicalize the principals and possibly validate permissions (2115). The ACM can first attempt to use an in-memory cache of canonical mappings. The storage provider can be queried for other cached canonical mappings (2120). Principal providers can be queried for all non-cached noncanonical entries (2125). The canonicalized ACL can be persisted in the storage provider to allow for subsequent modification of the ACL (2130).

The information to be encrypted and stored in the document (e.g., ticket and ACL) can be provided to the Crypto Service Provider (2135), which can create a document key that will be used to encrypt the document. If document shredding is not desired, then document key, ticket, and ACL can be encrypted using the server public key. If shredding is desired, then the document key should not be encrypted as the key should not leave the server. If the system is using server-side securing, the encrypted ticket data from the Cryptography module can be embedded within the document, and the document key can be used to encrypt the document (2140). If the system is using client-side securing, this is not needed.

The system can audit that a document was secured (2145). If the system is using server-side securing, the encrypted file can be returned to the client (2150). Otherwise the encrypted ticket data and the document key can be returned to the client (2150). If the system is using client-side securing, the document securer on the client can embed the encrypted ticket data and encrypt the document using the document key on the client (2155).

Figure 22:
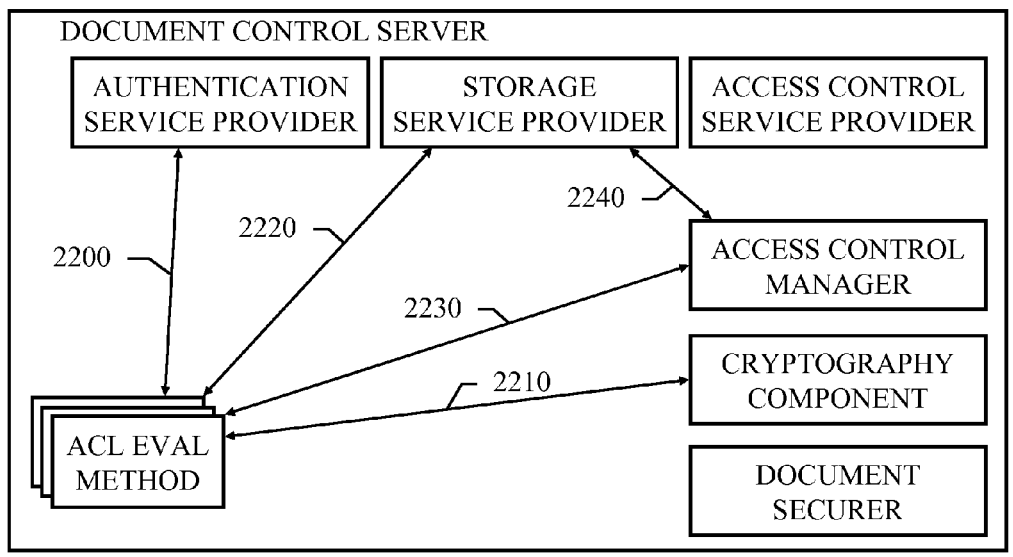
FIG. 22 is a block diagram illustrating server-side access control list evaluation workflow in the document control server of FIG. 12.

FIG. 22 is a block diagram illustrating server-side ACL evaluation workflow in the document control server of FIG. 12. When the server performs an operation that involves permissions, the server can first determine the authenticated user identity (2200). The encrypted server control information within the document can be decrypted (2210). The ticket in the encrypted control information can be used to retrieve the most recent document ACL from the storage service provider (2220). The Access Control Manager can evaluate the ACL, determining which permissions are relevant to the authenticated user (2230). The ACL may reference groups, and so the storage provider can be queried to determine which groups the authenticated user belongs to (2240).

Figure 23:
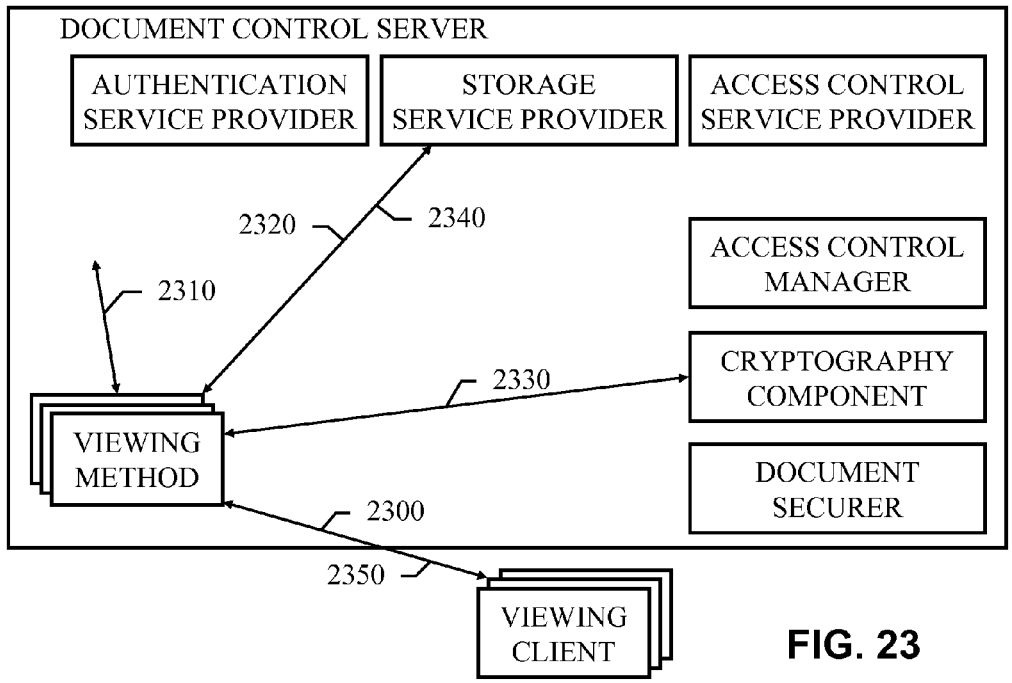
FIG. 23 is a block diagram illustrating online document viewing workflow in the document control server of FIG. 12.

FIG. 23 is a block diagram illustrating online document viewing workflow in the document control server of FIG. 12. Viewing a document while online can involve two major phases. The first phase involves determining which permissions the authenticated user has, and the second phase involves returning the document key to decrypt the document on the client. When a document is to be viewed online, a viewing application can open a secured document and recognize that the document is associated with the control server (e.g., the document can involve a security handler in the viewing client). Using the server RPC interface, the viewing application can transmit to the server the encrypted control information within the encrypt dictionary in the document (2300). The server can evaluate the ACL as an operation that involves permissions (2310), as described above in connection with FIG. 22. Then, the storage provider can be queried to ensure this document has not been revoked (2320). The document key can be extracted from the control information (2330). The server can audit the online viewing of this document (2340). The most recent ACL, the rules for viewing this document, as well as the document key can then be returned to the viewing client (2350). The viewing application can then enforce the permissions (e.g., the security handler can inform the viewing application what permissions to enforce, and provide the decryption key such that the document can be viewed).

Figure 24:
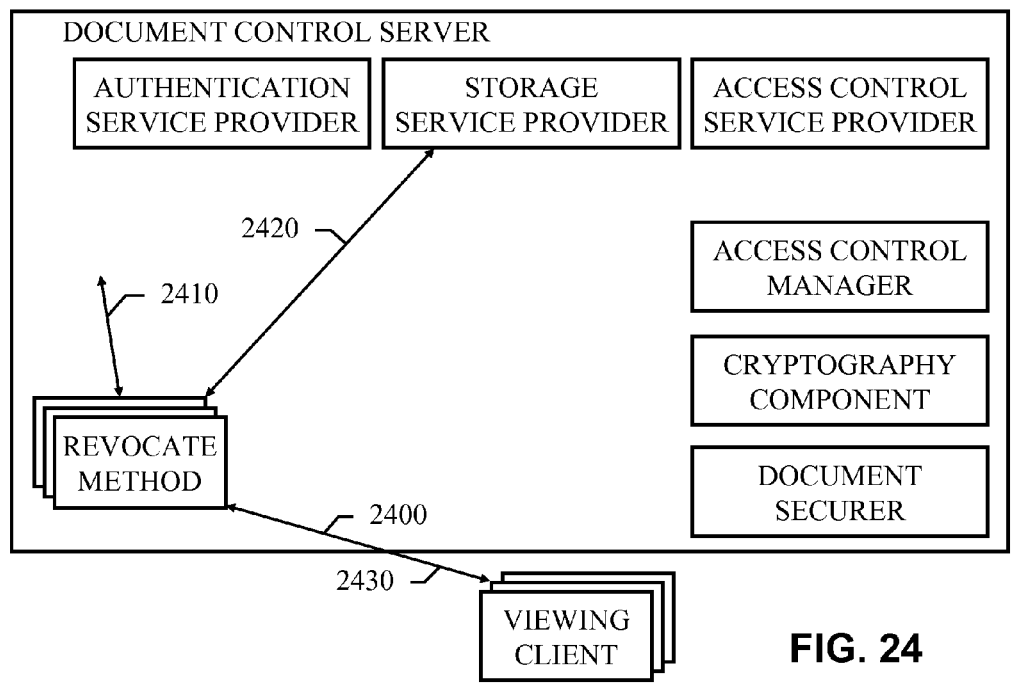
FIG. 24 is a block diagram illustrating revocation workflow in the document control server of FIG. 12.

FIG. 24 is a block diagram illustrating revocation workflow in the document control server of FIG. 12. The client can send the encrypted control information to the server (2400). The server can determine whether the authenticated user has permission to revoke the document (2410), as described above in connection with FIG. 22. The server can then revoke the document (2420). The client can receive an acknowledgement (2430).

Figure 25:
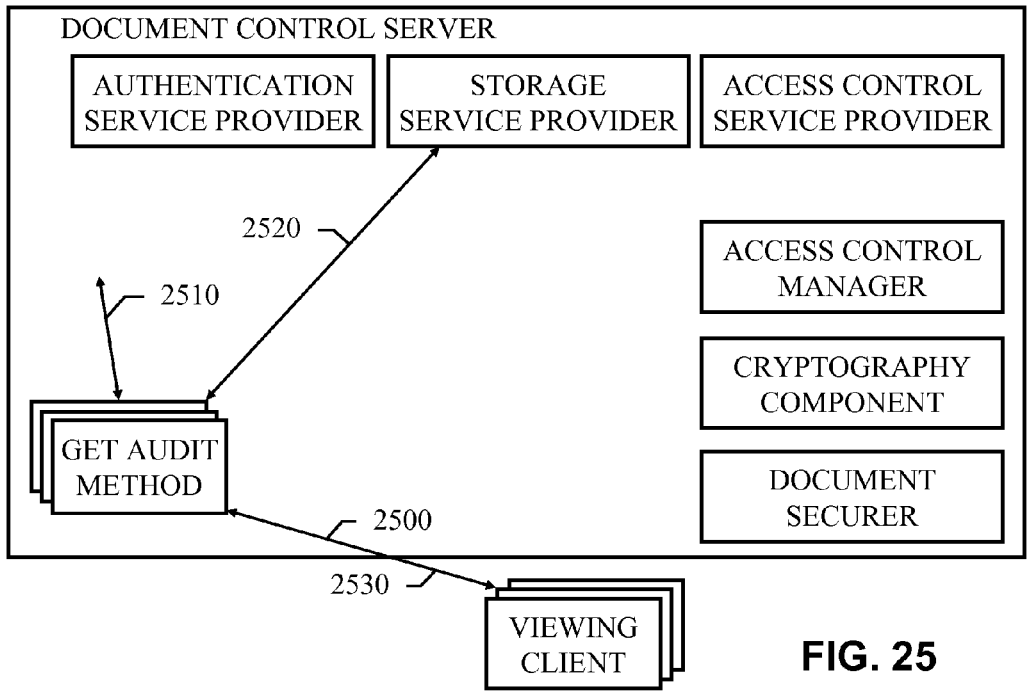
FIG. 25 is a block diagram illustrating audit events retrieval workflow in the document control server of FIG. 12.

FIG. 25 is a block diagram illustrating audit events retrieval workflow in the document control server of FIG. 12. The client can send the encrypted control information to the server (2500). The server can determine whether the authenticated user has permission to get the audit history for this document (2510), as described above in connection with FIG. 22. The storage provider can be queried to determine what events are relevant to this document (2520). The client can then receive and display the audit information to the user (2530).

Figure 26:
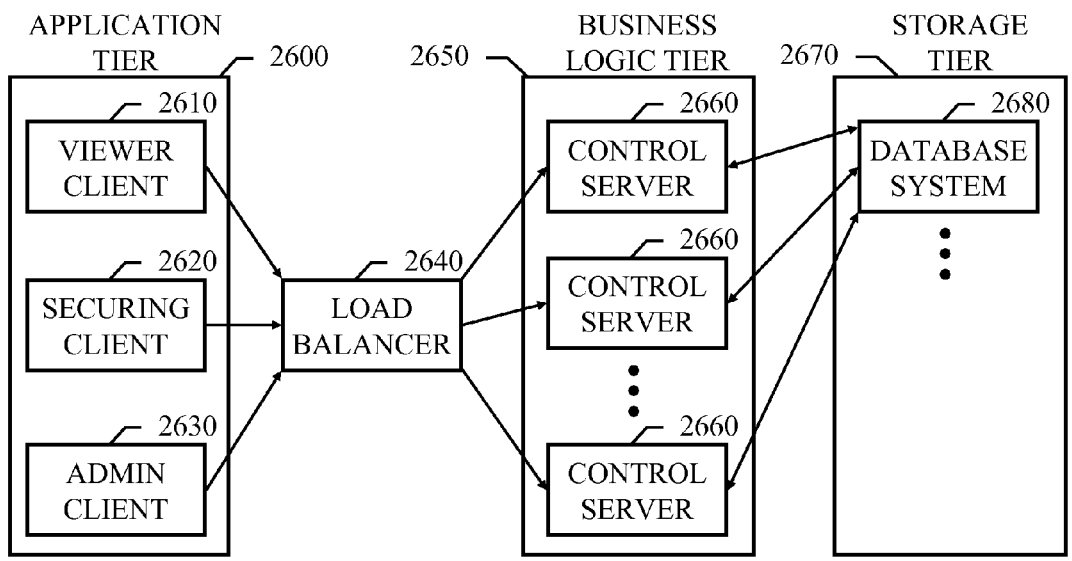
FIG. 26 is a block diagram illustrating a document control system with multiple document control servers.

FIG. 26 is a block diagram illustrating a document control system with multiple document control servers 2660. The system can use a three tier architecture to provide reliability and scalability. Clients 2610, 2620, 2630 in an application tier 2600 communicate with the document control servers 2660 in a business logic tier 2650, which communicate with enterprise systems (e.g., a database management system (DBMS) 2680) in a storage tier 2670. All server state that is not specific to that particular instance of the server can be stored in the third tier 2670 so that multiple server instances can share such state.

When multiple document control server instances 2660 are used, requests can be routed to other servers if one goes down. A load balancer 2640 can handle routing of requests to the server instances 2660. Within a server itself, high reliability can be achieved by writing the server in a language using managed code, e.g., Java or a .NET language. In order to manage many canonical and non-canonical principals, two levels of cache can be provided for principal information. A server 2660 can have an in-memory cache of canonical mapping and group membership for recently queried canonical users. Many document control servers can share the secondary cache within the storage provider.

Should the desired information not exist within either of these caches, the servers can directly access the direct principal providers within the Access Control service provider and then cache the information both locally and within the storage provider. Group membership information should be batch processed such that it can be retrieved as needed in a reasonable amount of time. One of the document control servers, as a secondary service, can be designated a master and have the responsibility of performing the batch processing tasks. In many cases, the actual securing can be done on the client to remove the overhead of transferring the document to and from the server and to reduce the load on the server. Likewise, with client-side securing, the client can also perform the document encryption, further decreasing server load.

The three-tier architecture allows server replicas to be added to scale to large enterprises. Documents can be tethered to a cluster of servers instead of to a specific hostname, as described above. DNS (Domain Naming System) round-robin can be added to the system to allow for additional hardware to act as document control servers. The servers can contain no state, so the hardware scalability concern can be reduced to the standard "one database" problem. Algorithms regarding principal management can be designed to be O(1) for individual operations and O(n) for aggregate operations (batch processing, etc.).

The invention and all of the functional operations described in this specification can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the operations of the invention can be performed in a different order and still achieve desirable results. The operations can be provided as a hosted service, using a subscription business model, and integrations can be performed with generally available system infrastructure available over the Internet. The document version control techniques can be implemented using peer-to-peer systems and techniques. Moreover, the sets of permissions for documents can be extended to cover various actions with respect to document content given different workflows (e.g., permissions that allow only certain people to sign a document, or portions of a document, and/or permissions that control who may fill out and/or view different sections of an electronic form).

Additionally, an alternative to always synchronizing policy updates but not necessarily other ACLs, can involve providing information regarding which ACLs in the system have changed. Synchronization operations can then be divided into high and low priority operations. High priority synchronizations can occur in the background more frequently, and provide indications of when information has changed. For example, an indication of which access control lists and policies have changed since the client's last synchronization. Low priority synchronization operations can entail how information has changed. For example, this can include the offline access information for every document in the system that has changed. Synchronizing how access control information has changed should be generally more resource intensive than a summary of what has changed. If access control for a document has been modified and the client is aware of a modification but has not performed a low priority synchronization, the system can be conservative and an implementation can prevent access to that document until the low priority synchronization has taken place.

What is claimed is:

1. A machine-implemented method comprising:
presenting, by a server of a document control system to a client system, the server comprising at least one processor and at least one memory device, an electronic document tethered to the document control system, wherein the document control system provides persistent document security for documents tethered to the document control system;
while presenting the electronic document to the client system, periodically showing the client system a consent query that requests consent to specific auditing actions relating to user interaction with the presented electronic document, the specific auditing actions to be recorded by the document control system for the electronic document;
receiving in response to the presented consent query, a consent indication with respect to a consent statement relating to specific auditing actions;
sending information corresponding to the consent indication to the document control system, the consent indication information configured to be included with actions-taken information relating to the electronic document; and
altering, by the server of the document control system, one or more permissions associated with the electronic document in accordance with the consent indication information.

2. The method of claim 1, wherein the consent query includes a predefined list of consent statements, and wherein receiving the consent indication comprises receiving a selection from the predefined list of consent statements.

3. The method of claim 1, further comprising signing the consent statement to generate the consent indication information to send.

4. A non-transitory machine-readable medium, encoding instructions that, when performed by one or more data processing apparatus, cause the one or more data processing apparatus to perform operations comprising:
presenting, by a server of a document control system to a client system, an electronic document tethered to the document control system, wherein the document control system provides persistent document security for documents tethered to the document control system;
while presenting the electronic document to the client system, periodically showing the client system a consent query that requests consent to specific auditing actions relating to user interaction with the presented electronic document, the specific auditing actions to be recorded by the document control system for the electronic document;
receiving in response to the presented consent query, a consent indication with respect to a consent statement relating to specific auditing actions;
sending information corresponding to the consent indication to the document control system, the consent indication information configured to be included with actions-taken information relating to the electronic document; and
altering, by the server of the document control system, one or more permissions associated with the electronic document in accordance with the consent indication information.

5. The non-transitory machine-readable medium of claim 4, wherein the consent query includes a predefined list of consent statements, and wherein receiving the consent indication comprises receiving a selection from the predefined list of consent statements.

6. The non-transitory machine-readable medium of claim 4, wherein the operations further comprise signing the consent statement to generate the consent indication information to send.

7. A computer system comprising:
one or more programmable processors of a server of a document control system, wherein the document control system provides persistent document security for documents tethered to the document control system, and wherein the one or more programmable processors are communicatively coupled to an input device and to an output device, and are configured to perform operations comprising:
presenting, to a client system, an electronic document tethered to the document control system;
while presenting the electronic document to the client system, periodically showing the client system a consent query that requests consent to specific auditing actions relating to user interaction with the presented electronic document, the specific auditing actions to be recorded by the document control system for the electronic document;
receiving, in response to the presented consent query, a consent indication with respect to a consent statement relating to specific auditing actions;
sending information corresponding to the consent indication to the document control system, the consent indication information configured to be included with actions-taken information relating to the electronic document; and
altering one or more permissions associated with the electronic document in accordance with the consent indication information.

8. The computer system of claim 7, wherein the consent query includes a predefined list of consent statements, and wherein to perform the receiving of the consent indication the one or more programmable processors are configured to perform operations comprising:
receiving a selection from the predefined list of consent statements.

9. The computer system of claim 7, wherein the one or more programmable processors are configured to perform operations comprising:
  signing the consent statement to generate the consent indication information to send.

10. A method comprising:
  receiving, by a server of a document control system from a client system, the server comprising at least one processor and at least one memory device, a request to open an electronic document tethered to the document control system, wherein the document control system provides persistent document security for documents tethered to the document control system;
  in response to the request to open the electronic document, presenting a page of the electronic document to the client system;
  determining that the electronic document is being scrolled to a new page or that the page of the electronic document has been presented to the client system for more than a set amount of time;
  in response to the determination, presenting to the client system a consent query that requests consent to be audited for viewing the electronic document, wherein the consent is to be recorded by the document control system for the electronic document;
  receiving in response to the presented consent query, a consent indication with respect to a consent statement relating to being audited for viewing the electronic document; and
  sending information corresponding to the consent indication to the document control system, the consent indication information configured to be included with actions-taken information relating to the electronic document.

11. The method of claim 10 comprising:
  in response to the request to open the electronic document and prior to said presenting the page of the electronic document to the client system, presenting to the client system a warning indicating that consent to be audited for viewing the opened electronic document is required.

12. The method of claim 10 comprising:
  precluding future presentation of the electronic document if the consent statement, to which the received consent indication refers, relates to user disapproval to being audited for viewing the opened electronic document.

13. The method of claim 10 comprising:
  altering, by the server of the document control system, one or more permissions associated with the electronic document in accordance with the consent indication information.

14. The method of claim 10, wherein the consent query includes a predefined list of consent statements, and wherein receiving the consent indication comprises receiving a selection from the predefined list of consent statements.

15. The method of claim 10, further comprising signing the consent statement to generate the consent indication information to send.

16. A non-transitory machine-readable medium, encoding instructions that, when performed by one or more data processing apparatus, cause the one or more data processing apparatus to perform operations comprising:
  receiving, by a server of a document control system from a client system, the server comprising at least one processor and at least one memory device, a request to open an electronic document tethered to the document control system, wherein the document control system provides persistent document security for documents tethered to the document control system;
  in response to the request to open the electronic document, presenting a page of the electronic document to the client system;
  determining that the electronic document is being scrolled to a new page or that the page of the electronic document has been presented to the client system for more than a set amount of time;
  in response to the determination, presenting to the client system a consent query that requests consent to be audited for viewing the electronic document, wherein the consent is to be recorded by the document control system for the electronic document;
  receiving in response to the presented consent query, a consent indication with respect to a consent statement relating to being audited for viewing the electronic document; and
  sending information corresponding to the consent indication to the document control system, the consent indication information configured to be included with actions-taken information relating to the electronic document.

17. The non-transitory machine-readable medium of claim 16, wherein the operations further comprise:
  in response to the request to open the electronic document and prior to said presenting the page of the electronic document to the client system, presenting to the client system a warning indicating that consent to be audited for viewing the opened electronic document is required.

18. The non-transitory machine-readable medium of claim 16, wherein the operations further comprise precluding future presentation of the electronic document if the consent statement, to which the received consent indication refers, relates to user disapproval to being audited for viewing the opened electronic document.

19. The non-transitory machine-readable medium of claim 16, wherein the operations further comprise altering, by the server of the document control system, one or more permissions associated with the electronic document in accordance with the consent indication information.

20. The non-transitory machine-readable medium of claim 16, wherein the consent query includes a predefined list of consent statements, and wherein receiving the consent indication comprises receiving a selection from the predefined list of consent statements.

21. The non-transitory machine-readable medium of claim 16, wherein the operations further comprise signing the consent statement to generate the consent indication information to send.

22. A system comprising:
  one or more hardware processors of a server of a document control system, wherein the document control system provides persistent document security for documents tethered to the document control system; and
  a non-transitory machine-readable medium, encoding instructions that, when performed by one or more hardware processors, cause the server of the document control system to perform operations comprising:
    receiving, from a client system, a request to open an electronic document tethered to the document control system;
    in response to the request to open the electronic document, presenting a page of the electronic document to the client system;
    determining that the electronic document is being scrolled to a new page or that the page of the electronic document has been presented to the client system for more than a set amount of time;

in response to the determination, presenting to the client system a consent query that requests consent to be audited for viewing the electronic document, wherein the consent is to be recorded by the document control system for the electronic document;

receiving in response to the presented consent query, a consent indication with respect to a consent statement relating to being audited for viewing the electronic document; and sending information corresponding to the consent indication to the document control system, the consent indication information configured to be included with actions-taken information relating to the electronic document.

23. The system of claim 22, wherein the operations further comprise:

in response to the request to open the electronic document and prior to said presenting the page of the electronic document to the client system, presenting to the client system a warning indicating that consent to be audited for viewing the opened electronic document is required.

24. The system of claim 22, wherein the operations further comprise precluding future presentation of the electronic document if the consent statement, to which the received consent indication refers, relates to user disapproval to being audited for viewing the opened electronic document.

25. The system of claim 22, wherein the operations further comprise altering one or more permissions associated with the electronic document in accordance with the consent indication information.

26. The system of claim 22, wherein the consent query includes a predefined list of consent statements, and wherein receiving the consent indication comprises receiving a selection from the predefined list of consent statements.

27. The system of claim 22, wherein the operations further comprise signing the consent statement to generate the consent indication information to send.

* * * * *